United States Patent
Leveille et al.

(10) Patent No.: US 7,877,552 B2
(45) Date of Patent: Jan. 25, 2011

(54) SYMMETRIC MULTIPROCESSOR FAULT TOLERANT COMPUTER SYSTEM

(75) Inventors: Paul A. Leveille, Grafton, MA (US);
Thomas D. Bissett, Shirley, MA (US);
Stephen S. Corbin, Amherst, NH (US);
Jerry Melnick, Wayland, MA (US);
Glenn A. Tremblay, Escondido, CA (US); Satoshi Watanabe, Tokyo (JP);
Keiichi Koyama, Tokyo (JP)

(73) Assignee: Marathon Technologies Corporation, Littleton, MA (US)

( * ) Notice: Subject to any disclaimer, the term of this patent is extended or adjusted under 35 U.S.C. 154(b) by 542 days.

(21) Appl. No.: 11/419,936

(22) Filed: May 23, 2006

(65) Prior Publication Data
US 2007/0214340 A1 Sep. 13, 2007

Related U.S. Application Data

(60) Provisional application No. 60/683,801, filed on May 24, 2005.

(51) Int. Cl.
*G06F 13/00* (2006.01)
(52) U.S. Cl. .................. 711/147; 711/153; 711/163; 711/203; 714/5; 714/6
(58) Field of Classification Search .............. 711/153, 711/206; 710/22, 26
See application file for complete search history.

(56) References Cited

U.S. PATENT DOCUMENTS

| | | | | |
|---|---|---|---|---|
| 4,758,951 A * | 7/1988 | Sznyter, III | ............ | 711/206 |
| 6,397,242 B1 * | 5/2002 | Devine et al. | ............ | 718/1 |
| 6,907,477 B2 * | 6/2005 | Altman et al. | ............ | 710/22 |
| 7,080,375 B2 * | 7/2006 | Martin | ............ | 718/100 |
| 7,299,337 B2 | 11/2007 | Traut | | |
| 7,310,721 B2 | 12/2007 | Cohen | | |
| 2002/0078308 A1 | 6/2002 | Altman et al. | | |

FOREIGN PATENT DOCUMENTS

WO 1999026133 A2 5/1999

OTHER PUBLICATIONS

International Search Report under the Patent Cooperation Treaty for PCT Application No. PCT/US06/19754 Search and Examination Report dated Oct. 17, 2007 (3 pages).
Supplementary European Search Report under Rule 62 of the European Patent Convention for Application No. EP 06 77 0856, Nov. 10, 2010 (6 pages).

* cited by examiner

*Primary Examiner*—Hetul Patel
(74) *Attorney, Agent, or Firm*—Fish & Richardson P.C.

(57) ABSTRACT

A symmetric multiprocessing fault-tolerant computer system controls memory access in a symmetric multiprocessing computer system. To do so, virtual page structures are created, where the virtual page structures reflect physical page access privileges to shared memory for processors in a symmetric multiprocessing computer system. Access to shared memory is controlled based on physical page access privileges reflected in the virtual paging structures to coordinate deterministic shared memory access between processors in the symmetric multiprocessing computer system. A symmetric multiprocessing fault-tolerant computer system may use duplication or continuous replay.

32 Claims, 23 Drawing Sheets

1300

| Step | Processor A | | | Processor B | | |
|---|---|---|---|---|---|---|
| | Quantum | PC | ACCESS (X,Y,Z) | Quantum | PC | ACCESS (X,Y,Z) |
| 1201 | --- | A1 | (X:None,Y:None, Z:None) | --- | B1 | (X:None,Y:None, Z:None) |
| 1202 | (P,QA2+1) | A2 | (X:WR) | (I,QB2) | B2 | ( - ) |
| 1203 | (I,QA3) | A3 | (X:RO) | (P,QB3+1) | B3 | (X:RO) |
| 1204 | (P,QA4+1) | A4 | (Y:RO) | (P,QB4+1) | B4 | (Z:RO) |
| 1205 | (P,QA5+1) | A5 | (Y:RW) | (P,QB5+1) | B5 | ( - ) |
| 1206 | (P,QA6+1) | A6 | (Y:NONE,Z:RW) | (0) | B5 | (Y:RW,Z:None) |
| 1207 | (I,QA7) | A7 | (X:NONE) | (P,QB7+1) | B7 | (X:RW) |
| 1208 | (I,Qmax) | A8 | ( - ) | (I,Qmax) | B8 | ( - ) |
| 1209 | (P,QA9+1) | A9 | (X:RO,Z:None) | (P,QB9+1) | B9 | (X:RO,Z:RW) |
| 1310 | 1320A | 1330A | 1340 | 1320B | 1330B | 1340B |

FIG. 13

FIG. 15 Using Self-Mapping entry to access translation structure

Virtual to Physical Address Translation

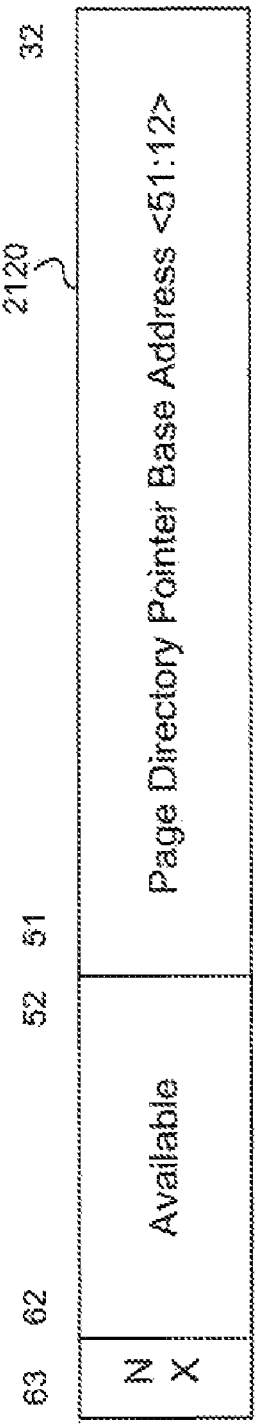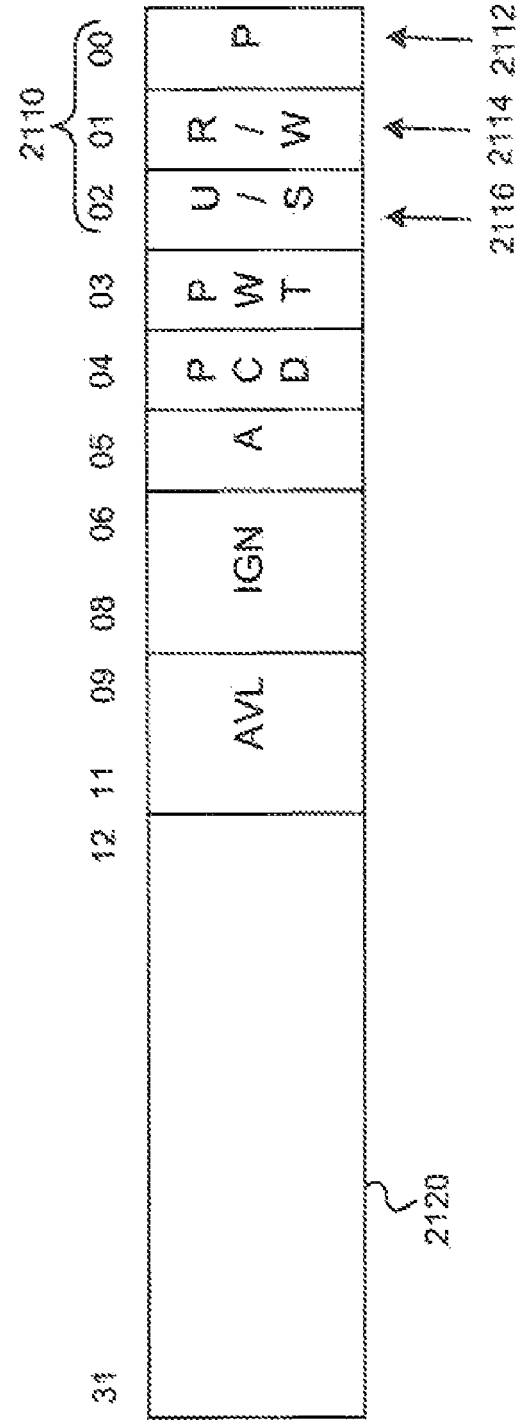
FIG. 21

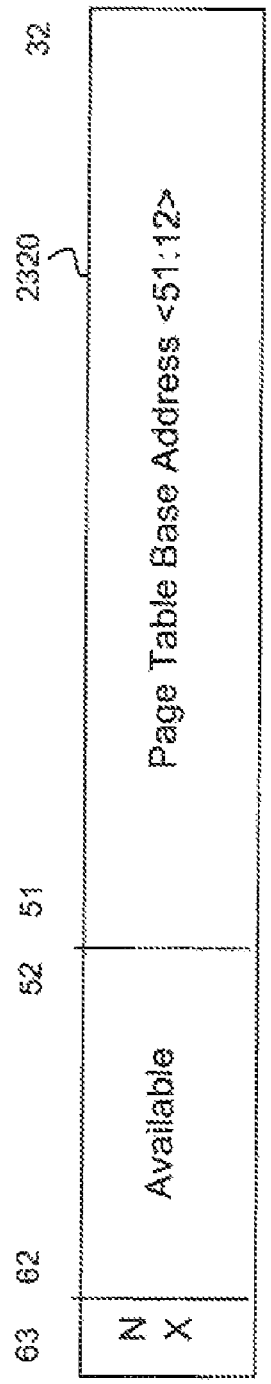
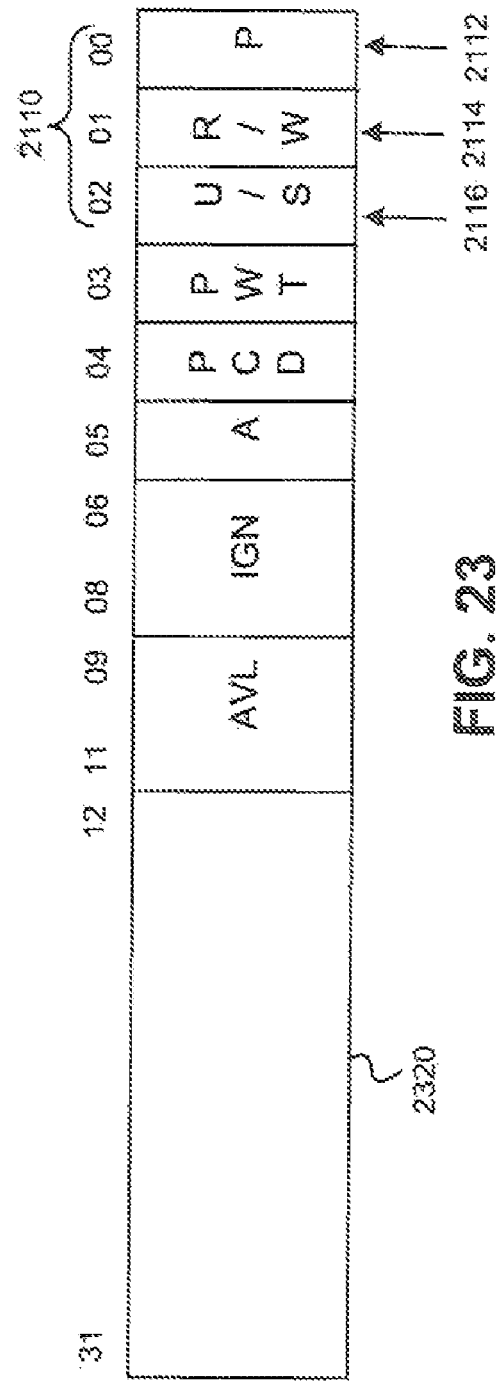
FIG. 23

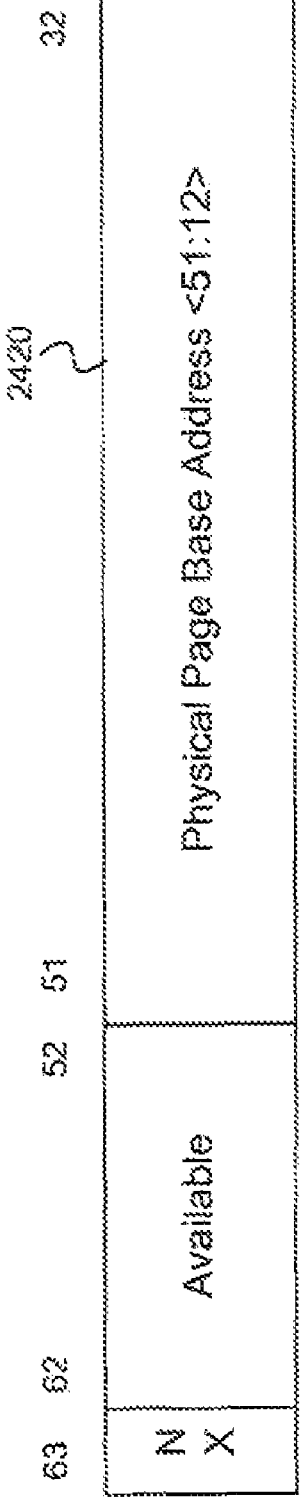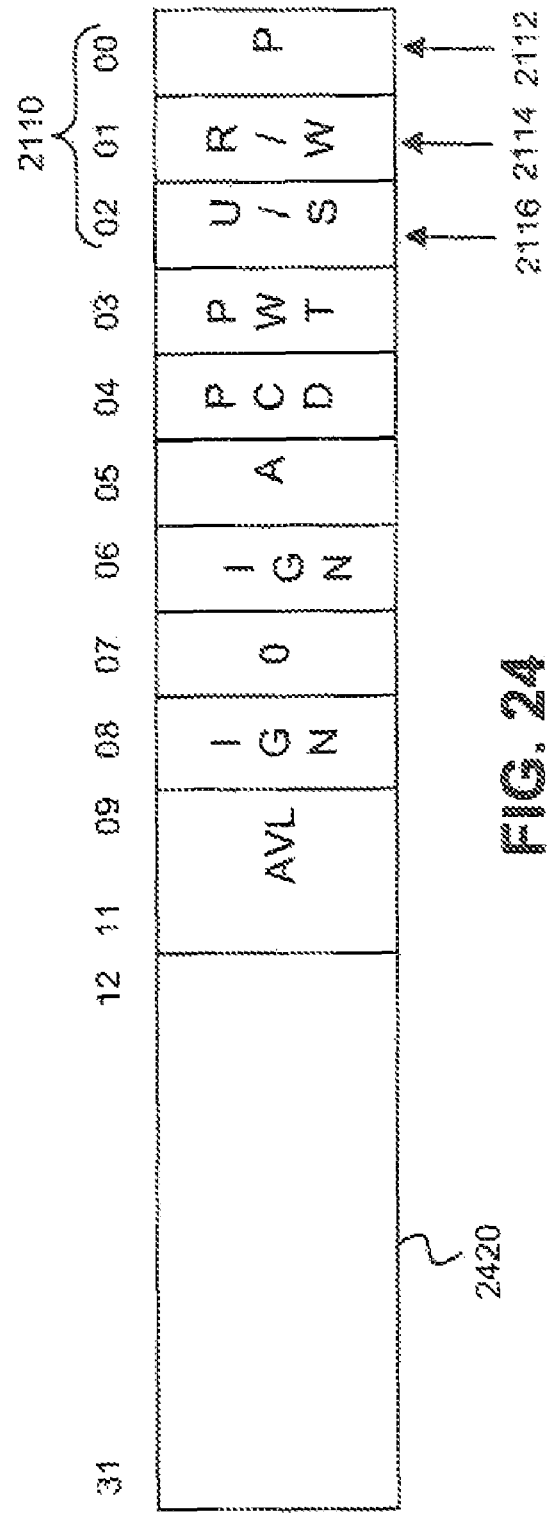
FIG. 24

SYMMETRIC MULTIPROCESSOR FAULT TOLERANT COMPUTER SYSTEM

CROSS REFERENCE TO RELATED APPLICATIONS

This application claims the benefit of U.S. Provisional Application No. 60/683,801, filed May 24, 2005, and titled SYMMETRIC MULTIPROCESSOR FAULT TOLERANT COMPUTER SYSTEM, which is incorporated by reference.

TECHNICAL FIELD

The description relates to maintaining synchronized execution of loosely coupled symmetric multiprocessors in a fault tolerant, fault resilient, or disaster tolerant computer system.

BACKGROUND

Fault tolerance generally requires replication, either in space or in time. For replication in space (which may be referred to as duplication), two sets of processors should exhibit the same sequence of events given the same starting point and the same input stream. On a failure, the failing set of processors is removed from the configuration and processing continues.

For replication in time (which may be referred to as replay), there are two general options: checkpoint/restart and continuous replay. A checkpoint/restart system creates a checkpoint or snapshot of the current state of the system and a journal file of all inputs since the checkpoint. On a failure, the checkpoint is loaded on another set of processors and the journal file is applied. In some implementations or under some conditions, the original sequence of events may not be important, depending, for example, on the level of coordination between the operating system (OS), the application, and the checkpoint facilities. As an example, if no work has been committed, any permitted sequence of events is acceptable.

Replication also may be accomplished by continuous replay, which uses two sets of processors (like duplication) and a journal stream (similar to a checkpoint/restart system). The first set of processors record into the journal the sequence of events observed. The second set of processors use the journal to reproduce that sequence of events during the replay.

Duplication generally requires a high level of determinism in the sequence of events. An advantage of duplication is that fault tolerance generally can be made application independent and operating system independent. A disadvantage of duplication is that duplication generally requires dedicated duplicate hardware and a high level of determinism.

A checkpoint/restart system does not necessarily require determinism in the sequence of events. A checkpoint/restart system also does not require dedicated duplicate hardware resources. A checkpoint/restart system does, however, generally require application and operating system modifications to make the system work. A checkpoint/restart system also has a fairly lengthy recovery time based on the frequency of the checkpoints and the length of the journal file.

Continuous replay is application and operating system independent, like duplication, but continuous replay has a reduced level of required determinism. Like duplication, continuous replay requires dedicated duplicate hardware. Continuous replay needs a journal stream similar to checkpoint/restart, but its does not need checkpoints or operating system support, and it does not generally have a lengthy recovery time. The journal stream is a sequence of directions that flow from the primary set of resources to the secondary set of resources that indicates the sequence of events that were observed.

SUMMARY

In one general aspect, implementing a fault-tolerant computer system using symmetric multiprocessing computer systems includes controlling at least one of the symmetric multiprocessing computer systems by creating virtual paging structures and controlling access to shared memory based on physical page access privileges reflected in the virtual paging structures to coordinate deterministic shared memory access between processors in the symmetric multiprocessing computer system. A virtual paging structure is associated with a processor in the symmetric multiprocessing computer system and reflects physical page access privileges to shared memory for the processor.

Implementations may include one or more of the following features. For example, controlling access to shared memory may include receiving a request from a processor to access a portion of memory, determining access to the portion of memory to be permitted by the processor by comparing the virtual paging structure for the processor to the virtual paging structures for other processors that access the portion of memory, and updating physical page access privileges in the virtual paging structure for the processor based on the access to be permitted by the processor.

The processor may include a task executing on a processor. The virtual paging structure may include shadow page tables, where a shadow page table includes a copy of a page table created by the operating system of the symmetric multiprocessing computer system and is associated with a processor of the symmetric multiprocessing computer system. The virtual paging structure may include nested page tables that collectively provide two or more levels of virtual to physical translation.

Page tables may be created prior to execution of any task by a processor in the symmetric multiprocessing computer system. At least page directories may be created prior to execution of any task by a processor in the symmetric multiprocessing computer system.

The fault-tolerant computer system may be a duplication fault tolerant computer system that includes two symmetric multiprocessing computer systems operating simultaneously in instruction lock-step. Each symmetric multiprocessing computer system controls access to shared memory based on physical page access privileges reflected in virtual paging structures to coordinate deterministic shared memory access between processors in the symmetric multiprocessing computer system.

The fault-tolerant computer system may be a continuous replay fault-tolerant computer system that includes a first symmetric multiprocessing computer system and a second symmetric multiprocessing computer system. The first symmetric multiprocessing computer system processes an instruction stream and creates a journal reflecting a sequence of events at the first symmetric multiprocessing computer system. When a failure of the first symmetric multiprocessing computer system is detected, the journal is processed using the second symmetric multiprocessing computer system, such that the first and second symmetric multiprocessing computer systems operate in instruction lock-step. The second symmetric multiprocessing computer system creates virtual paging structures, where a virtual paging structure is associated with a processor in the second symmetric multiprocessing computer system and reflects physical page access privileges to shared memory for the processor. Access to shared memory is controlled based on physical page access privileges reflected in the virtual paging structures to coordinate deterministic shared memory access between processors in the second symmetric multiprocessing computer system.

The details of one or more of the implementations are set forth in the accompanying drawings and description below. Other features will be apparent from the description and drawings, and from the claims.

DESCRIPTION OF DRAWINGS

FIGS. 4, 5 and 21-24 are block diagrams of formats of page table entries in a fault-tolerant symmetric multiprocessing computer system.

FIG. 13 is a diagram of a journal stream for a sequence of interactions between two processors in a fault-tolerant symmetric multiprocessing computer system shown in FIG. 12.

Like reference symbols in the various drawings indicate like elements.

DETAILED DESCRIPTION

Figure 1:
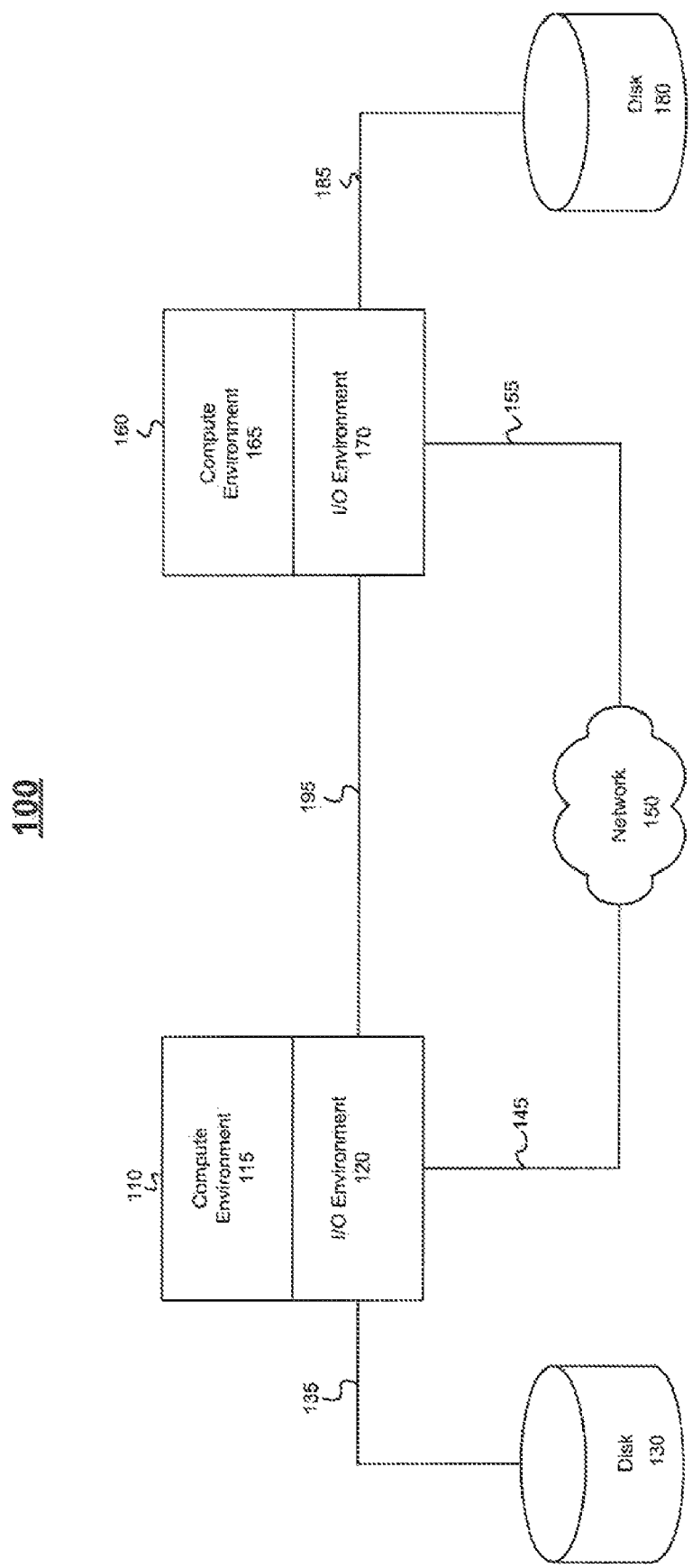
FIG. 1 is a block diagram of a fault-tolerant symmetric multiprocessing computer system.

Techniques are described for producing symmetric multiprocessor (SMP) fault tolerant and/or disaster tolerant computer systems (collectively, "fault tolerant computer systems"). An example SMP fault tolerant computer system that uses duplication is described, as is another example SMP fault tolerant computer that uses continuous replay.

An issue with SMP operation relates to the coordination and resolution of the simultaneous access to memory. In contrast with single processor fault tolerant systems that only address interactions of a single processor with interrupts and I/O completion, a SMP fault tolerant computer system also needs to take into account interactions between multiple processors. As such, a symmetric multiprocessor fault tolerant computer system needs to address an additional level of determinism in comparison with single processor fault tolerant computer systems. One challenge of a fault tolerant system that uses either duplication or continuous replay is being able to reproduce memory access ordering by processors and tasks. Another challenge is to reproduce memory access ordering without having any knowledge of where or when memory accesses occur, as is necessary to maintain operating system and application independence in a fault tolerant system.

An example of an application that processes two simultaneous changes to a bank account is presented. The bank account has an initial balance of $75, one of the changes to the bank account is subtracting $100, and the other change is adding $50. When two processors each attempt to perform one of the changes to the bank account at substantially the same time, there are two possible account balance sequences. Each possible sequence produces the same answer. More particularly, Processor A attempts to subtract $100 from the account as Processor B attempts to add $50 to the account. If Processor A performs the subtraction before Processor B performs the addition, the account balance sequence is $75 (initial balance), −$25 (after Processor A subtracts), +$25 (after Processor B adds). In contrast, if Processor B performs the addition before Processor A performs the subtraction, the account balance sequence is $75 (initial balance), $125 (after Processor B adds), and $25 (after Processor A subtracts). A fault tolerant system should identically produce the answer produced by the application Another form of common memory access is a loosely coupled form of memory access and may be, for example, used for monitoring functions. For example, a database system may keep a set of performance metrics to track, for example, the number of data base updates, the number of times a record is modified, and the number of transactions executed per time interval. In some database application contexts, the metrics may need to only be a close approximation of reality (as opposed to requiring a more exact measure). In an illustrative example, Processor A and Processor B increment a record count without any attempt to avoid contention. Starting with a record count value of 5, the count after both processors attempt an increment may be 7, which is the case when the increments do not collide. However, when the increments of the two processors collide, the count after both processors attempt an increment would be 6. In some contexts, a developer of a multiprocessing database application may decide that either answer (i.e., 6 or 7) is sufficient for the intended application and an exact record of whether the count was 7 or 6 is not needed. However, such a practice of loosely counting events to avoid contention is non-deterministic behavior and should not be used in fault tolerant system that uses either duplication or continuous replay. Non-deterministic behavior is not permitted in either duplication or a continuous replay fault tolerant system because a consistent answer should be produced by the fault tolerant system.

Producing an SMP fault tolerant system using industry standard motherboards may be challenging. A clock lockstep design generally relies on the fact that replicated parts in a system receive the same clocking structure and react in the same way to that clocking structure. This helps to automatically resolve conflicts in a deterministic and repeatable fashion. This requires that the clocking structure, memory, chipset, processors, and motherboard layout act deterministically. While this may be practical for a custom design, it may not be generally available in an industry standard motherboard.

Techniques are described that coordinate an instruction lockstep design such that the sequence of conflict resolutions can be guaranteed in a symmetric multiprocessor fault tolerant system. Instruction lockstep refers to the coordination of processors such that two processors execute the same instruction stream given the same starting state and applying the same inputs relative to their respective instruction streams. This description relates to the coordination of event sequences such that memory accesses are deterministically handled. In addition, techniques are described that allow the construction of loosely coupled (such as coupling through instruction lockstep) symmetric multiprocessing fault tolerant system using industry standard servers and motherboards or using commercially available servers and motherboards.

Duplicated Fault Tolerant System

FIG. 1 shows an example of a duplicated fault tolerant system using symmetric multiprocessing computer systems in which access to shared memory is based on physical page access privileges reflected in virtual paging structures. System 100 includes two industry standard symmetric multiprocessing computer servers 110 and 160, which each may be, for example, a standard x86 server. Server 110 includes two execution environments, a compute environment 115 and an I/O environment 120. I/O environment 120 has access to disk 130 through link 135, to network 150 through link 145, and to the other server 160 through link 195. Server 160 includes two execution environments, a compute environment 165 and an I/O environment 170. I/O environment 170 has access to disk 180 through link 185, to network 150 through link 155, and to the other server 110 through link 195. The I/O environments 120 and 170 handle asynchronous, and therefore non-deterministic, I/O operations in system 100. The compute environments 115 and 165 are symmetric multi-processing deterministic elements and operate in instruction lockstep. For brevity, the system 100 represents the general form of an example fault tolerant system, though other configurations can be used. For example, configurations may be used that involve multiple networks, network-attached storage, multiple disk subsystems, or storage area network (SAN) storage subsystems. In general, both servers 110 and 160 operate in instruction lockstep starting from the same initial state and operating on the same input data to produce the same output responses.

Figure 2:
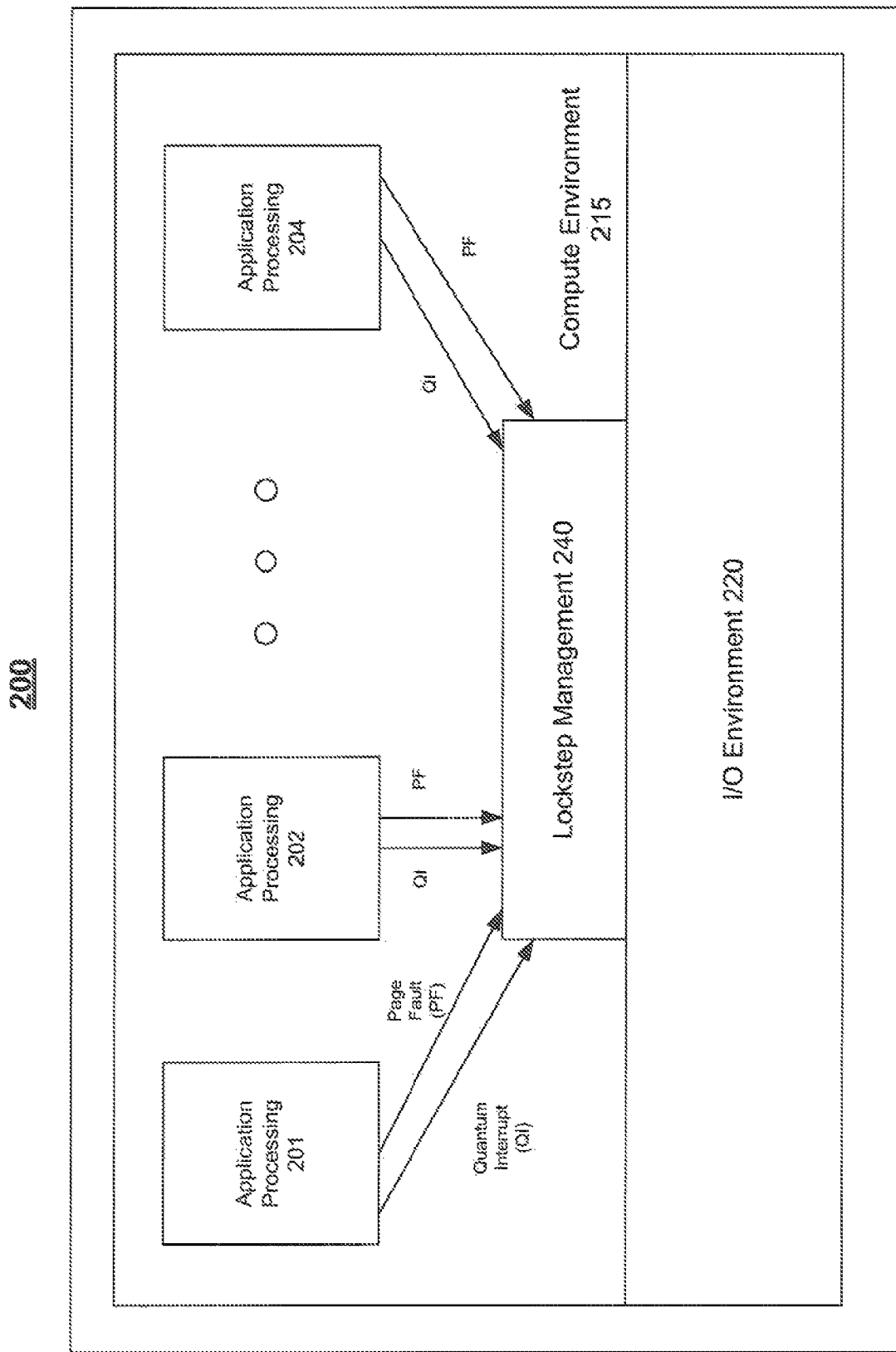
FIGS. 2 and 11 are block diagrams of servers in a symmetric multiprocessing computer system.

FIG. 2 shows a server 200, which may be an implementation of one of the servers 110 or 160 of FIG. 1. The server 200 has two components, the I/O environment 220 and the compute environment 215. The I/O environment 220 may include one or more processors for handling I/O devices and communications with the compute environment 215. Compute environment 215 is composed of multiple application processing 201, 202 . . . 204 and lockstep management 240. Application processing include an operating system and the applications running on that operating system. It is useful for the fault tolerant system to view the operating system and the applications as application processing. For example, this may enable a fault tolerant system to use industry standard operating systems and applications.

Referring to FIGS. 1 and 2, application processing 201, 202 . . . 204 in compute environment 115 of server 110 are duplicated by application processing 201, 202 . . . 204 in compute environment 165 of server 160. Each application process in compute environment 115 is operating in instruction lockstep with a corresponding application process in compute environment 165. Lockstep management 240 in each compute environment 115 and 165 is responsible for coordinating the instruction streams of the application processing 201, 202 . . . 204.

The central processing unit (CPU) of a computer may be represented by an application processing 201 and a portion of lockstep management 240. For a hyper-threaded CPU design, such as the Intel P4 Xeon from Intel Corporation of Santa Clara, Calif., each hyper-thread may be represented by an instance of application processing 201 and a portion of lockstep management 240. In a multi-core CPU design, each core or each hyper-thread in a core may be represented by an instance of application processing 201 and a portion of lockstep management 240.

An alternate approach to lockstep management 240 may be used in which lockstep management 240 resides in the I/O environment 220. In such a case, generally only synchronous activity happens in the compute environment 215. Lockstep management 240 can also straddle compute environment 215 and I/O environment 220.

In some implementations, one processor in the compute environment 215 may be dedicated to lockstep management 240. Alternatively or additionally, each processor in the compute environment 215 may execute a portion of lockstep management 240. In the example of FIG. 2, application processing 201 plus a portion of lockstep management 240 represents one logical processor in the compute environment 215.

Lockstep management 240 generally controls lockstep application processing 201 through two basic techniques. The first technique involves scheduling a quantum of work to be done by application processing 201. The second technique involves controlling the virtual memory to physical memory mapping page tables. The quantum technique is a process used for synchronously dividing or slicing-up an unknown instruction stream. Both the operating system and the applications being run are considered unknown instruction streams because the operating system and the applications are not modified to be used in a fault tolerant computer system—that is, commercial operating systems and applications may be used as part of a fault tolerant computer system without requiring modification to the commercial operating system or application. As such, an operating system and applications can operate as parts of a fault tolerant computer system without being aware of the fault tolerant context.

Often, a timer interrupt is used by the operating system to monitor events and to schedule tasks and threads. Traditional timer interrupts are not necessarily synchronous with respect to the instruction stream and therefore may cause divergence in a duplicated fault tolerant system. A quantum of work related to the instruction stream is used to provide synchronous interrupts to the processor. When that quantum of work is completed, a quantum interrupt transitions control from application processing to lockstep management.

The basic process for controlling SMP processing environments is to present a modified virtual paging structure to the processors. Interactions between the processors can then be detected and controlled through page faults and paging structure changes.

Referring to FIGS. 3-8, coordinating memory access generally requires being able to detect a memory access request and intervene in the delivery of that request when necessary. One approach to do so is through the use of page faults in a memory management system for virtual address translation.

Figure 3:
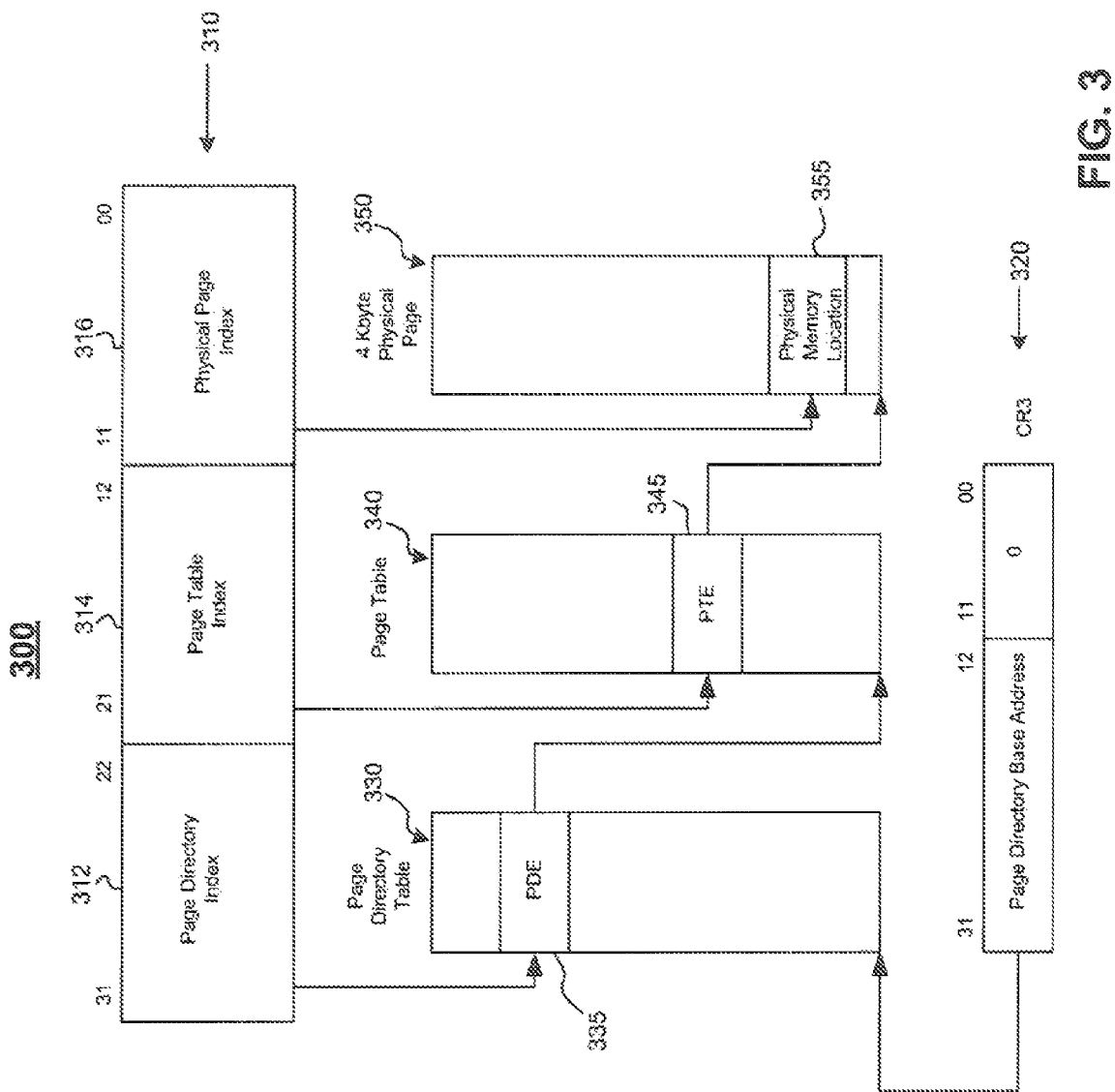
FIGS. 3, 7, 8, 15-20 are block diagrams of examples of translation of a virtual address to a physical address in a fault-tolerant symmetric multiprocessing computer system.

Referring to FIG. 3, an example translation process 300 shows the translation of virtual address 310 to physical address for the x86 processor family from AMD of Sunnyvale, Calif. or Intel® handling 4 GB of address space with 32 bit page tables and 4K physical pages. The techniques also may be used with other memory translation structures for the x86 processors of another type, such as 2 Megabyte pages, 4 Megabyte pages, 64 bit page tables, 36 bit Page Size Extension, 36 bit Page Address Extension, and 52 bit linear address translation. The techniques also may be applied to other processor families.

An instruction makes a reference to memory using a 32 bit virtual address 310. The virtual address 310 is translated to a physical address with the use of tables 330 and 340. Processor register CR3 320 includes the base address of the Page Directory (PD) Table 330. Bits <31:22> 312 of the virtual address 310 provide a 10-bit index from the Page Directory Table 310 base. The contents of this memory location is called the Page Directory Entry (PDE) 335 and provides the base address for the Page Table (PT) 340. Bits <21:12> 314 of the virtual address 310 provide a 10-bit index from the Page Table base. The contents of this memory location is called the Page Table Entry (PTE) 345 and provides the base address for the Physical Page 350 of memory being referenced. Bits <11:00> 316 of the virtual address 310 provide the 12-bit index from the Physical Page base to the physical memory location 355 being referenced.

Figure 4:
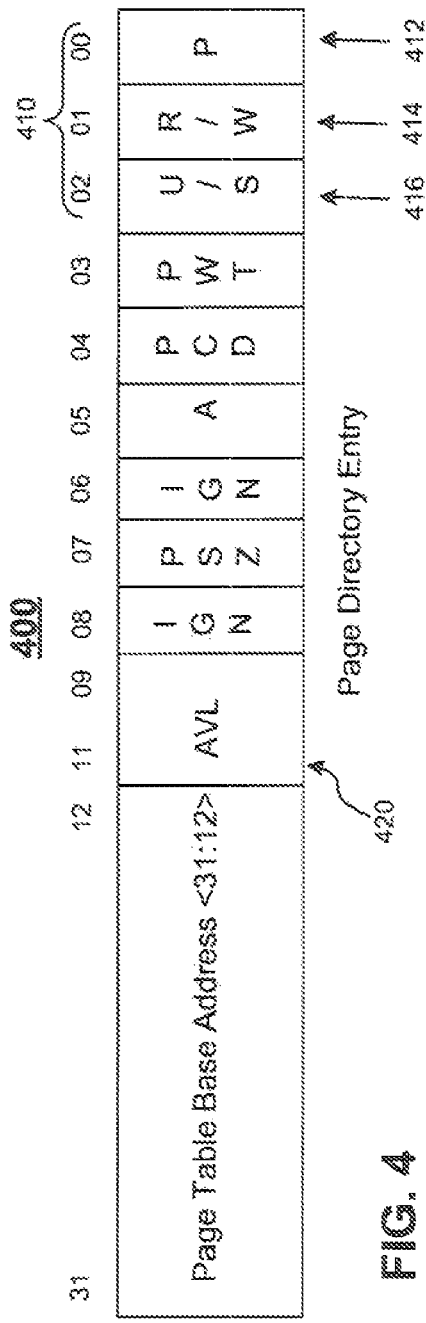
Figure 5:
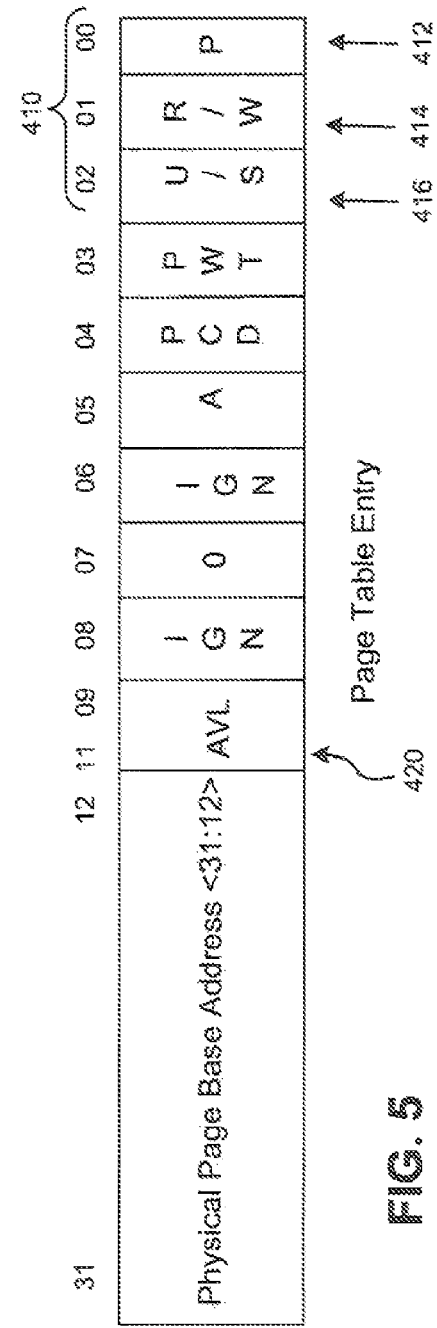

FIGS. 4 and 5 show the formats of a Page Directory Entry, such as PDE 330 of FIG. 3, and a Page Table Entry, such as PTE 345 of FIG. 3, respectively. The bits of interest in all of these tables are bits <2:0> 410. Bit 0 is the Present (P) flag 412, which indicates that the structure being pointed to by this entry is present in memory when set or inaccessible (paged out to disk or non-existent) when cleared. Bit 1 is a writeable flag 414 that is set to indicate the structure being pointed to by this entry is writeable. Bit 2 is an access flag 416 that indicates User or System (U/S) access is allowed to the structure to which the entry is pointing. Additionally, bits <11:9> 420 are marked as available (AVL) to indicate that the processor hardware does not use these bits in the structure and software may use them as desired.

A page fault is a system trap that occurs when a virtual memory reference can not be successfully performed due to permissions (R/W access), security (U/S access restrictions), or lack of physical presence (P flag). The trap causes the processor to suspend execution of the current instruction (memory access) and start executing the page fault handler. If the access violation can be resolved, the page tables are adjusted and the interrupted instruction stream is resumed such that the virtual memory reference is retranslated with the updated page tables. If the retranslation is successful, the instruction stream continues as if the page fault never occurred.

Page faults can be used to coordinate access to pages of physical memory. By modifying virtual translation controls R/W and Present, a current instruction stream can be either allowed or prevented from accessing memory. When such a technique is applied across all active instruction streams, coordinated access to all of memory may be accomplished, as described in more detail below.

For the purposes of the discussion that follows, the following terminology is used. A task is a sequence of instructions that is schedulable by the operating system. A thread is one of several tasks that share a common virtual address structure, as occurs in a multithreaded program. A process is a task that has a unique virtual address structure.

Figure 6:
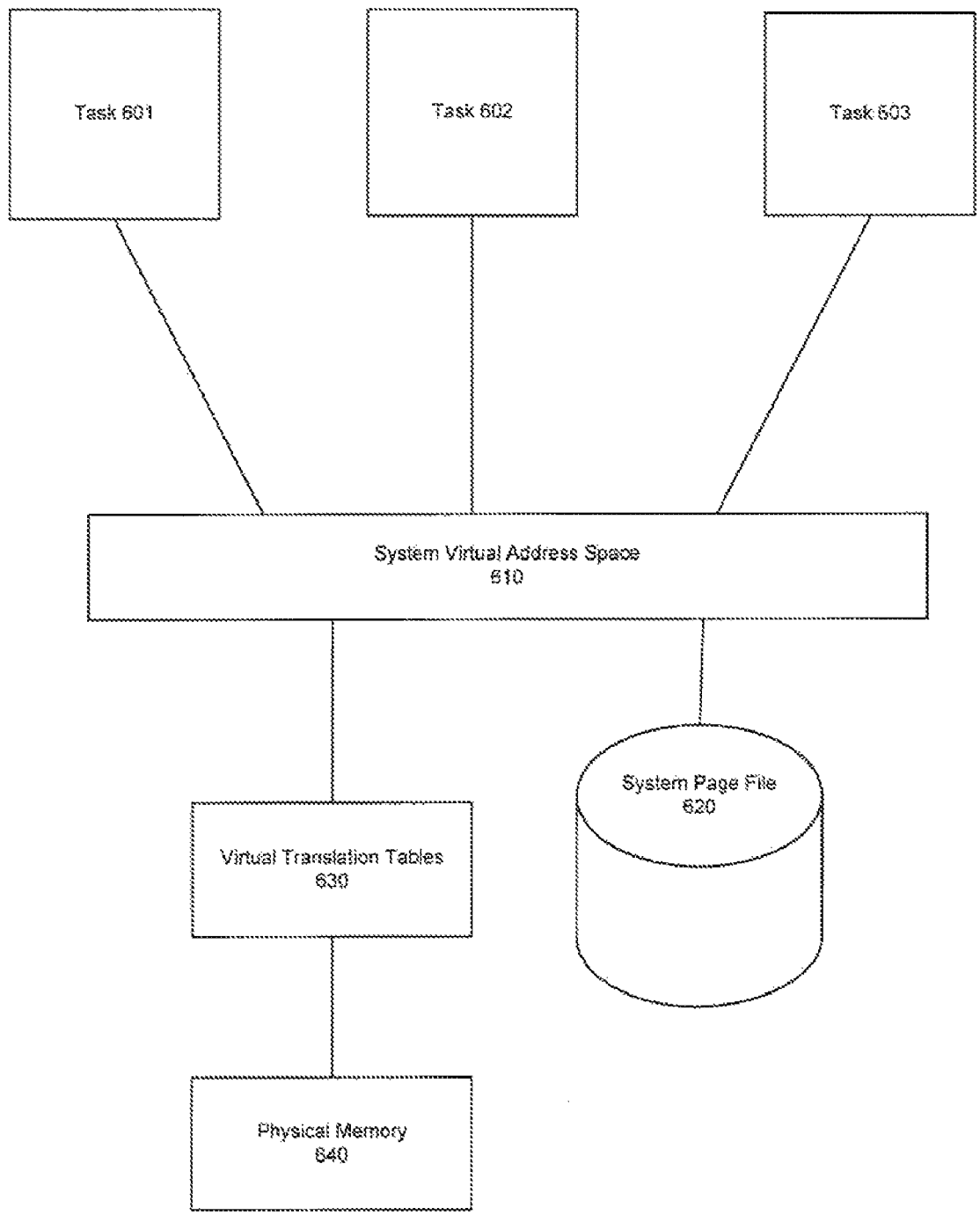
FIG. 6 is a block diagram of a virtual to physical memory configuration from the perspective of an operating system of a fault-tolerant symmetric multiprocessing computer system.

FIG. 6 represents an example 600 of a virtual to physical memory configuration as viewed from an operating system perspective. In the example 600, the operating system supports a number of tasks (601, 602 . . . 603). Each task has its own address space that the operating system maintains through the System Virtual Address Space 610. At any point in time, memory pages of the address space of task 601 may be included in physical memory 640 and/or in the system page file 620. For address space that is included in physical memory 640, virtual translation tables 630 provides the translation from virtual address to physical address as described previously in relation to FIG. 3. There are usually many more tasks being maintained by the operating system than there are processors (CPUs). Each CPU includes, as in FIG. 3, the virtual to physical translation structure for a single task (601, 602, or 603). Whenever a page fault occurs for task 601, the operating system resolves that fault by either terminating the faulting task or by making the memory request that caused the fault valid through changes in the virtual translation tables 630 and in physical memory 640. The resolution of that fault may require reallocating pages of physical memory 640, updating virtual translation tables 630 for task 601 as well as some other task (602 and 603), and exchanging pages of memory between physical memory 640 and system page file 620.

Figure 7:
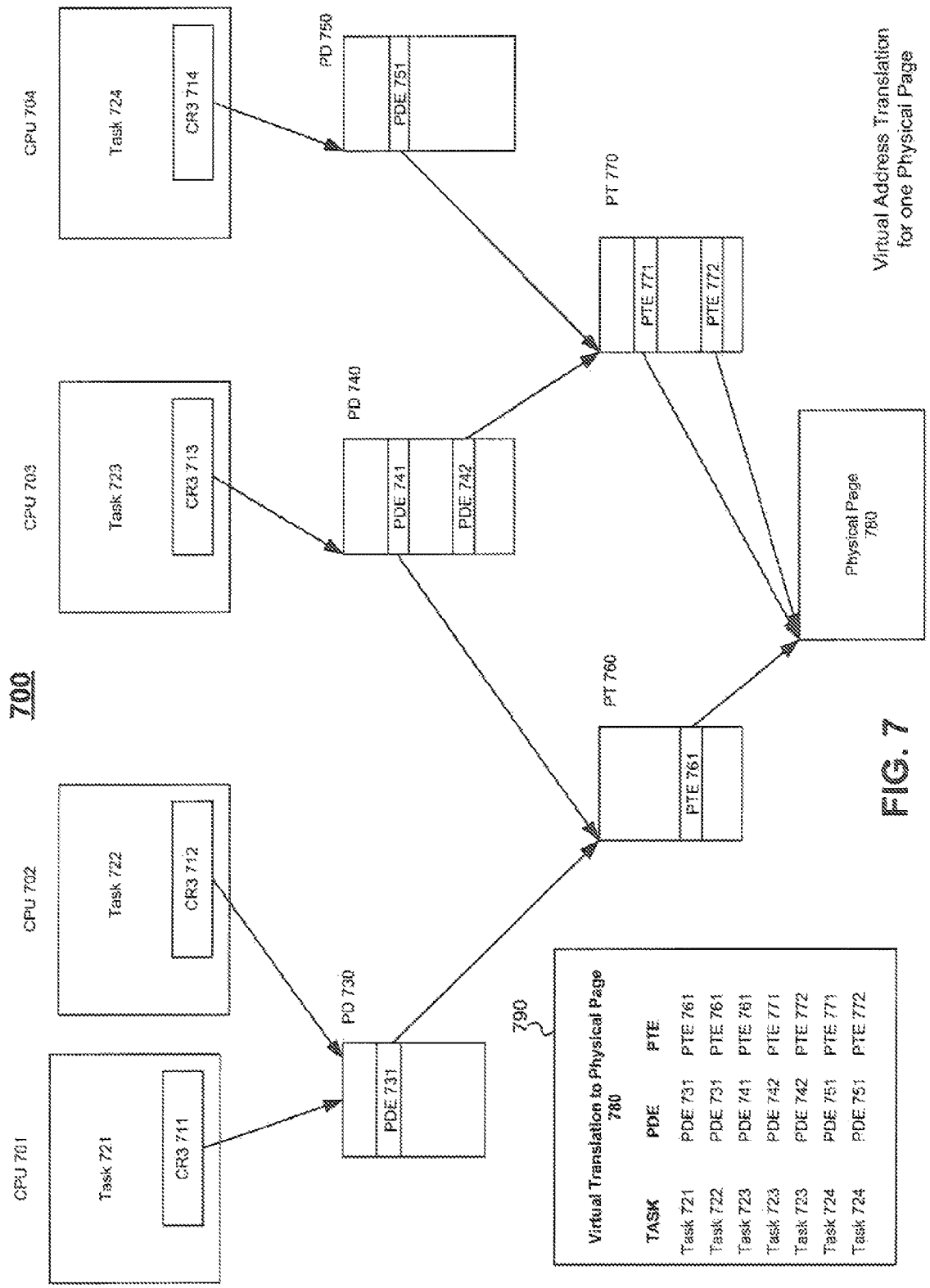

Referring to FIG. 7, further detail related to the virtual translation tables 630 of FIG. 6 is shown. Each CPU 701-704 has a corresponding CR3 register 711, 712, 713, and 714, which holds the Page Directory Base Address, which is the pointer to the virtual translation structure for the corresponding task (i.e., 721, 722, 723, and 724) running on that CPU. Only a piece of the translation structure is shown in FIG. 7 to highlight the interconnected nature of the system. Tasks 721 and 722 share a common page translation structure PD 730, or by the definition, they are two threads from a single process. Tasks 723 and 724 are separate processes that correspond, respectively, to page translation structures PD 540 and PD 750. As illustrated in FIG. 7, there are different virtual address translations that resolve to the same physical page—namely, physical page 780. More particularly, a table of indications 790 indicates a list, for tasks 721-724, of the various virtual translations to physical page 780. Task 721 has one mapping for physical page 780; PDE 731/PTE 761. Task 722, being a thread from the same process as Task 721, has the same single mapping to physical page 780—namely PDE 731/PTE 761. Task 723 has three mappings to physical page 780: PDE 741/PTE 761, PDE 742/PTE 771, and PDE 742/PTE 772. Task 724 has two mappings to physical page 780: PDE 751/PTE 771 and PDE 751/PTE 772.

As such, FIG. 7 represents the virtual address to physical translation in which elements shared between tasks in the mapping structure indicate shared access privileges. This structure may be used in conjunction with the structure 800 of FIG. 8 to coordinate deterministic shared access to memory, as described more fully below.

Figure 8:
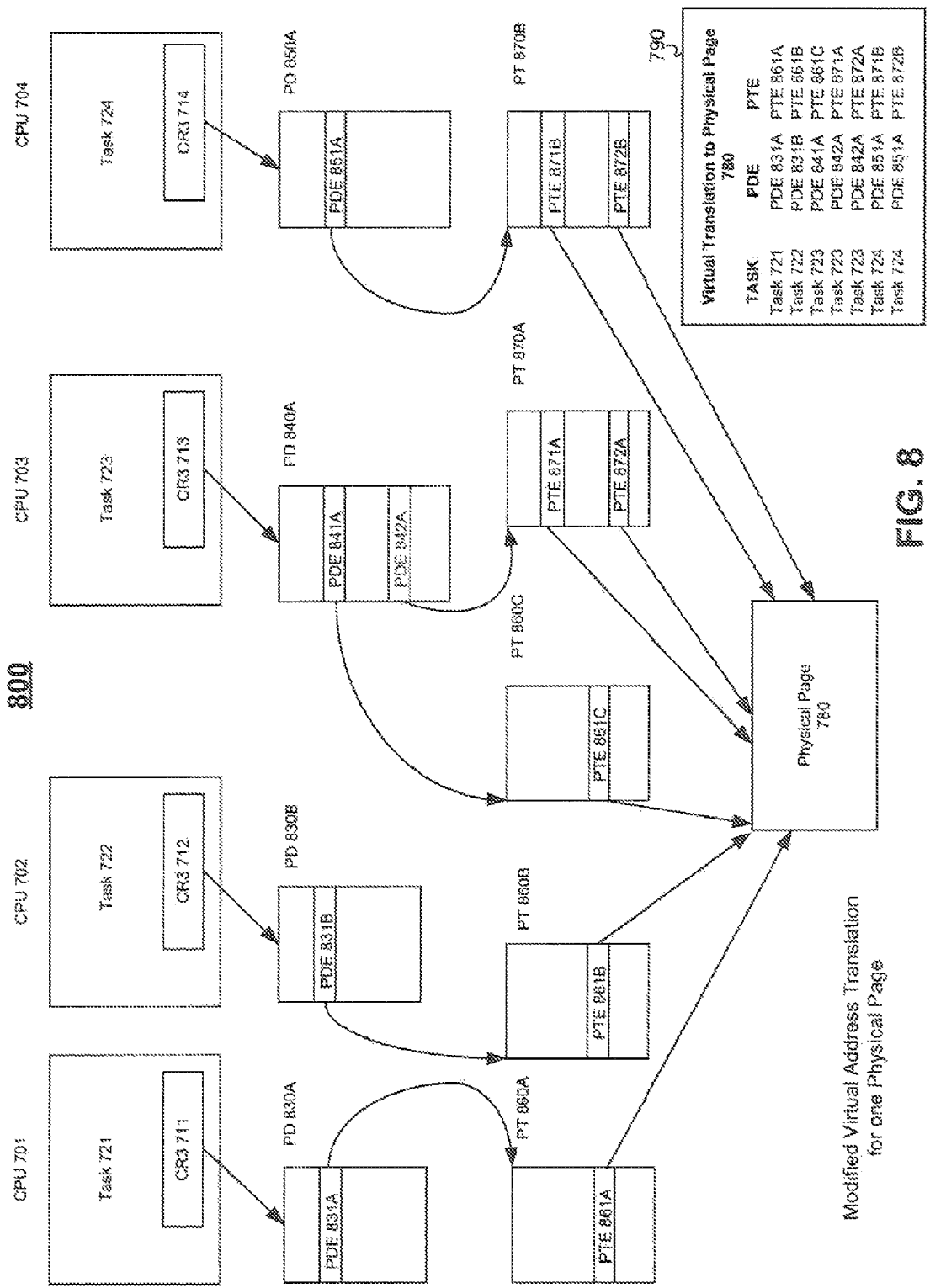

FIG. 8 presents a virtual to physical translation structure 800 configured such that the page translation structure that is presented to each individual CPU (701, 702, 703, and 704) is unique regardless of the overlap in actual physical pages. The virtual to physical translation structure 800 may be referred to as a virtual paging structure. The virtual to physical translation structure 800 may be used to coordinate memory access by using physical page access privileges for a task. FIG. 8 is identical to FIG. 7 in the mapping of virtual addresses to physical addresses. The difference is that FIG. 8 does not share any page directory or page table structures. Every CPU has a distinct set of virtual to physical mapping tables. With every virtual to physical translation path being unique, access privileges can now be individually controlled for each task by modifying the R/W bit 414 and the Present bit 412 shown in FIGS. 4 and 5.

Two techniques are presented for creating a unique translation. The first technique may be referred to as a shadow page table. The operating system sets up the page table structure as in FIG. 7. Before any task starts executing, the page table structure for that task in FIG. 7 is copied into a shadow page table structure as in FIG. 8. For task 721, the page table structure is located from CR3 711. Page directory PD 730 is copied to PD 830A. Page Table PT 760 is copied to PT 860A. The new page directory, PD 830A, is modified so that it points to the new Page Table, PT 860A. However, the new page table, PT 860A, points to the same physical pages as the old page table, PT 760. Finally, CR3 711 is modified to point to PD 830A instead of PD 730.

The second technique for creating this unique translation structure may be referred to as nested page tables. Nested page tables provide two or more levels of virtual to physical translation. This is a hardware mechanism that is being added to processor chips to aid in system virtualization. In a virtualized system, there is a host operating system that runs on the actual hardware. There are also a number of guest operating systems that are each running on virtualized hardware. The guest operating system executes as if it is installed on the actual hardware. The virtual to physical address translation that is set up by the guest operating system is not real. Every guest operating system believes it has access to the same physical memory locations. This is substantially similar to the problem that the virtual to physical translation solves for applications, where each application operates as if it is using the same physical address space, but in reality each application operates using the same virtual address space. With nested page tables, an application running on the guest operating system references a virtual memory location. The actual hardware uses the page table structure set up by the guest operating system to translate the guest virtual address into a guest physical address. The guest physical address is used as a processor specific virtual address and converted into a physical address using the page tables set up by the host operating system. A two level nested (virtual to virtual to physical translation) page table structure can be used to provide a unique per task page table structure, as is described in more detail later.

One approach for creating the virtual paging structure, such as paging structure 800 of FIG. 8, is to modify the actual paging structure produced by the operating system so as to maintain a data structure to track the differences between the original paging structure and the currently operating one. An alternate method is to replicate the paging structure and to present a modified duplicate of the paging structure to the processors. That replication can be all at once (duplicate the entire table immediately) or a gradual replication (as the processor accesses sections of its address space, the duplicate table structure is expanded). The process for duplicating the entire table at once is described below.

When a task is first created by the operating system, a paging structure as in FIG. 7 is created that is big enough to load the task. The task is then loaded into memory and the appropriate bits (P, R/W, U/S) are set in the paging tables. The CR3 register is loaded with the base address of the top level paging structure and the task is then started. Lockstep management 240 modifies this behavior by trapping the access to CR3. The paging structure that was set up by the operating system (FIG. 7) is duplicated to a shadow set (FIG. 8). The shadow structure is set up with restricted access rights. The shadow paging structures for all other processors in the system are compared against the shadow paging structure for this task. If any other processor has write access to a particular page, then this task gets no access (page is marked as not present, P=0). If any other processor has read access to a particular page, then this task gets read access. If no other processor has access to a particular page, then this task can have write access if it needs it. The CR3 register is then loaded by lockstep management 240 with the base address of the shadow paging structure. The paging structure guarantees that a processor with write access to a page has unique access to that page. The only way to share a page is with read access.

Execution of applications proceeds as follows:
1) Every processor is loaded with a maximum quantum of work that is to be performed.
2) Every processor is running on a shadow set of paging tables that guarantees exclusive write access.

All processors execute their instruction streams until either a page fault or the quantum of work is finished. Whenever a processor faults on a page reference, a decision is made by lockstep management 240 about what access should be granted to that page. When all processors have stalled waiting for either a page fault resolution or after finishing a quantum of work, the paging structures are updated and execution continues with a new quantum goal.

Page access is changed between NONE, READ, and READ/WRITE. NONE implies either that the page is really missing from memory or that the processor in question is being denied access to avoid a potential conflict. READ implies unrestricted read access for this processor. READ access to a given physical page may be granted to multiple processors at the same time. READ/WRITE implies exclusive access by this processor to a given physical page.

Figure 9:
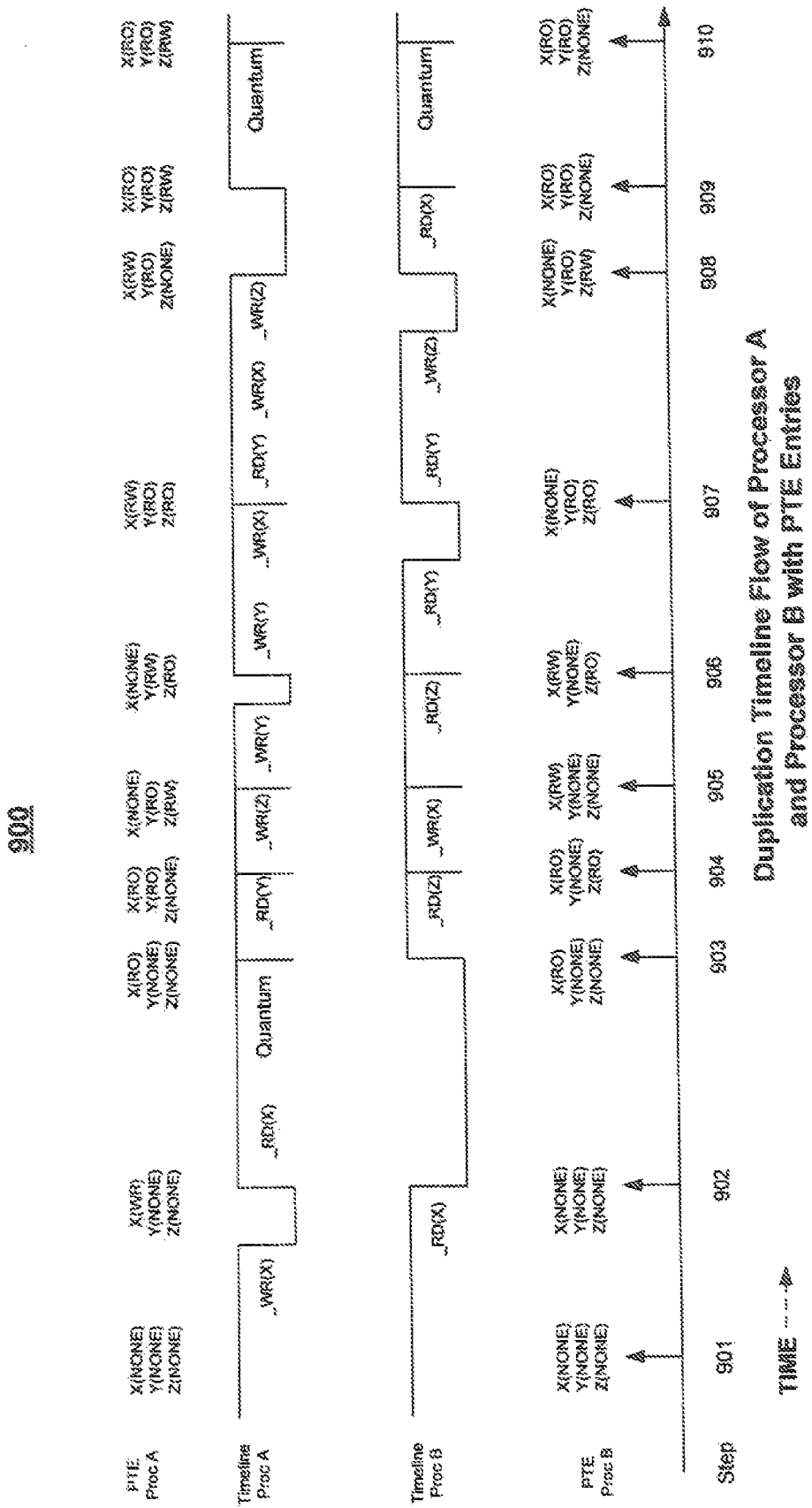
FIGS. 9, 12 and 14 are diagrams of timeline flows of interactions between two processors in a fault-tolerant symmetric multiprocessing computer system.

FIG. 9 shows the interactions 900 between two processors A and B (i.e., Proc A and Proc B) when traps are coordinated based on PTE access. The same types of interactions also occur for the PDE. The interactions 900 are presented in the context in which all pages start off as no access. This is the case for pages that are not in memory when a task first starts executing. In contrast, for a thread that is spawned, the PTE is likely to start off with Read Only access for most of its entries. When the processor timeline is "High", the processor is executing. When the processor timeline is "Low", the processor is stalled. Walking through the steps in FIG. 9:

Step 901:
No access by either processor to any of pages X, Y, Z.
Step 902:
Proc A attempts Write X with no privilege.
Proc B attempts Read X with no privilege.
Proc A is given Read/Write to page X (exclusive).
Proc B is stalled with no access to X.
Step 903:
Proc A quantum expires.
Proc B still waiting on Read X from step 902.
Proc A is downgraded to Read Only X (shared).
Proc B is given Read Only X (shared).
Step 904:
Proc A attempts Read Y with no privilege.
Proc B attempts Read Z with no privilege.
Proc A is given Read Only Y (shared).
Proc B is given Read Only Z (shared).
Step 905:
Proc A attempts Write Z with Read Only privilege.
Proc B attempts Write X with Read Only privilege.
Proc A is given None X and Read/Write Z (exclusive).
Proc B is given Read/Write X (exclusive) and None Z.
Step 906:
Proc A attempts Write Y with Read Only privilege.
Proc B attempts Read Z with Read Only privilege.
Proc A is given Read/Write Y (exclusive) and Read Only Z (shared).
Proc B is given Read Only Z (shared).
Step 907:
Proc A attempts Write X with no privilege.
Proc B attempts Read Y with no privilege.
Proc A is given Read/Write X (exclusive) and Read Only Y (shared).
Proc B is given None X and Read Only Y (shared).
Step 908:
Proc A attempts Write Z with Read Only privilege.
Proc B attempts Write Z with Read Only privilege.
Proc A is stalled with no access to Z.
Proc B is given Read/Write Z (exclusive).
Step 909:
Proc A is still waiting Write Z from step 908.
Proc B attempts Read X with no privilege.
Proc A is given Read Only X (shared) and Read/Write Z (exclusive).

Proc B is given Read Only X (shared) and None Z.

Step 910:

Proc A quantum expires.

Proc B quantum expires.

Proc A—no access change.

Proc B—no access change.

The interactions 900 of FIG. 9 show that the two processors may arrive in the PTE conflict state out of step in time with each other. When a true conflict in resources occurs, a processor spends the next execution cycle stalled rather than executing. This is the case for Proc B between steps 902 and 903, and again for Proc A between steps 908 and 909.

The policy for ordering access violations shown in steps 901 through 910 above should be both fair and deterministic. The policy should be fair to prevent starving a processor. This could be a form of "round robin" or statistical average. The determinism is necessary because the interactions are taking place in a duplicated fault tolerant system, in which two separate but equivalent computer systems are performing the same process at the same time with slight disturbances in their timing. As such, the arrival time of the page fault can not be a factor in determining the outcome.

Figure 10:
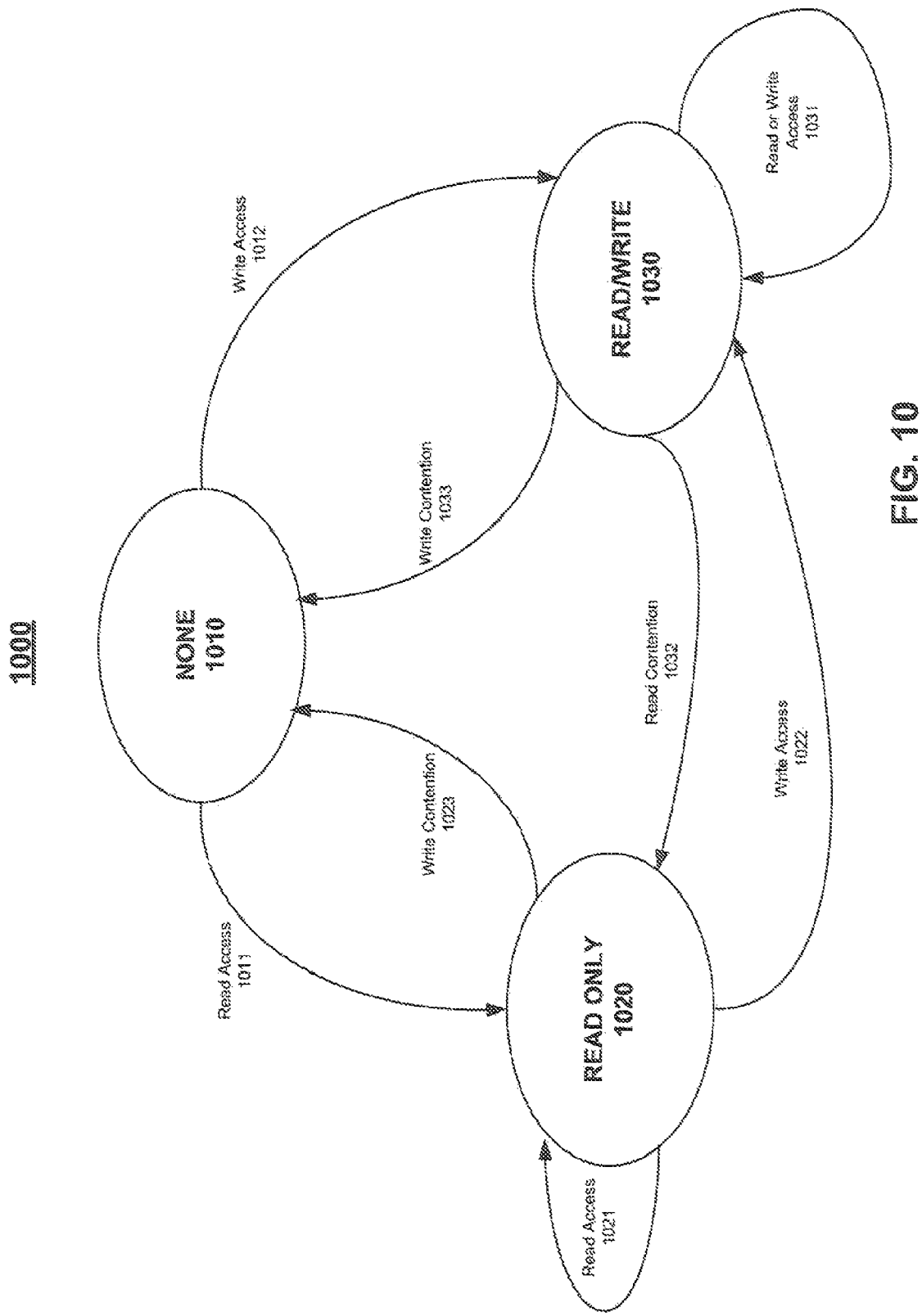
FIG. 10 is a state transition diagram for deterministic shared memory access for shadow page table structures maintained by a processor in a fault-tolerant symmetric multiprocessing computer system.

FIG. 10 shows the Deterministic Shared Memory Access (DSMA) State Transition Diagram for the shadow page table structures maintained for a processor. An entry in the shadow structure starts in state NONE 1010. This is indicated in the PTE 345 of FIG. 3 as having the present bit P=0 (bit <0>=0). Any attempt to access this page causes a trap to the page fault handler. Transition Read Access 1011 to state READ ONLY 1020 is taken when the processor performs a read access to that page. Note that this transition may be delayed as in steps 902 and 903 in FIG. 9 for processor B. Transition Write Access 1012 to state READ/WRITE 1030 is taken when the processor performs a write access to that page. This can be seen in step 902 of FIG. 9 for processor A.

In state READ ONLY 1020, the processor has the ability to read the page without incurring a trap to the page fault handler. This is represented in the PTE 345 of FIG. 3 as having R/W=0 and P=1 (bits<1:0>=01). Transition Read Access 1021 back to state READ ONLY 1020 represents this unimpaired ability to perform a read access. This transition can be seen in FIG. 9 between steps 907 and 908 for both processors A and B. Transition Write Access 1022 to state READ/WRITE 1030 is taken when a write access to the page occurs. This can be seen in FIG. 9 step 905 for processor B. Transition Write Contention 1023 is taken to state NONE 1010 when another processor needs exclusive write access to the page. This can be seen in FIG. 9 step 904 for processor A.

In state READ/WRITE 1030, the processor has the ability to read or write the page without incurring a trap to the page fault handler. Transition Read or Write Access 1031 shows this ability. This can be seen in FIG. 9 between step 902 and 903 and between steps 907 and 908 for processor A. Transition Read Contention 1032 to state READ ONLY 1020 is taken when another processor performs a read on this page. This can be seen in FIG. 9 step 903 for processor A. Transition Write Contention 1033 to state NONE 1010 is taken when another processor performs a write to this page. This can be seen in FIG. 9 step 907 for processor B.

If a processor is not generating page faults, then it should be disturbed with some sort of quantum access to avoid stalling the other processor(s) at a PTE fault. This can be seen in FIG. 9 at step 903 for processor A.

Additional or alternative policies can be used. For example, the following policies may be used:

1) Start all in-memory pages as READ ONLY 1020 in FIG. 10, which may be represented as (J(RO)) for all pages J in FIG. 10.
2) Transition from READ/WRITE 1030 to NONE 1010 on Read contention 1032. Also transition for READ ONLY 1020 to NONE 1010 on Read Contention 1024 (not shown). This forces exclusive access for READ ONLY 1020 and for READ/WRITE 1030, allowing more flexibility in using other alternate policies in this list.
3) Transition from NONE 1010 to READ ONLY 1020 on Read Contention 1013 (not shown). This gives all processors read access to a page when any processor gets read access.
4) Transition from NONE 1010 to READ ONLY 1020 on Read Access 1011 without waiting for access resolution with any other processor if no other processor is in state READ/WRITE 1030 which may be represented as (J(RW)) for page J.
5) Transition from NONE 1010 to READ/WRITE 1030 on Write Access 1012 or from READ ONLY 1020 on Write Access 1022 without waiting for access resolution with any other processor if all other processors are in state NONE 1010 (J(NONE)) for page J.

Referring again to FIGS. 7 and 8, the duplicated fault tolerant system 700 has two compute environments 715 and 765 each including multiple processors. Application processing 801 through 804 are run in instruction lockstep between compute environment 715 and compute environment 765. Instruction lockstep can be maintained because of the following details:

1) Processors have no direct access to any asynchronous I/O devices.
2) There are no asynchronous interrupts.
3) Time injection is done with respect to the processor instruction stream rather than by a timer interrupt.
4) Access to memory is restricted to exclusive if the processor is writing memory.
5) A change in memory access policy occurs only when all affected processors are stalled.
6) A processor only stalls on a memory access trap or on the completion of a quantum of work (both synchronous events).
7) Lockstep management 240, which is coordinating the memory policies, operates in an environment with unrestricted access to the memory structures being controlled.

This helps to ensure that there are no activities asynchronous to the processor instruction streams that are visible to the processors. Therefore, if the processors are started in instruction lockstep, they remain in instruction lockstep. These rules may be applied to any number of processors in a multi-processing environment.

For a fault tolerant system on an x86 platform, there are a number of instructions and architectural features that may cause divergence if the operating system or applications are allowed to touch them. In the past, a layer of software was required to isolate the hardware from the applications and operating system. For Windows based operating systems, the Hardware Abstraction Layer (HAL) was used to trap most of these problem areas. Other divergent features had to be eliminated by scanning ahead in the instruction stream to emulate the offending access or by doing a clean up after the divergence occurred. Recent developments in processors may make virtualized hardware a commodity item. Virtualized hardware may enable a fault tolerant system to direct the hardware to insulate potentially divergent architectural features from the operating system and the applications. This may be used as a reference platform on which the applications and operating system reside. Architecturally divergent processing is directed to an isolated environment similar to system management mode. Lockstep management could own or be included in this isolated environment. Features that are trapped in future virtualized hardware platforms are:
- Access to I/O devices
- Access to system control registers (Time Stamp Counter, CR3 among others)
- Access to performance counters (quantum)
- Access to memory management structures
- Continuous Replay Fault Tolerant System As noted previously, a fault tolerant system may be implemented using continuous replay. An advantage of a continuous replay fault tolerant system is that the stall time that a processor incurs waiting for access to a page may be mitigated without the need to tune the quantum. Generally, any time that a processor is stalled, potential system performance is being lost. The quantum can be made smaller to bound the maximum wait time, but if the quantum is made too small, the overhead of lockstep management 240 limits the performance of the system. To avoid the complications of tuning the quantum, continuous replay lets compute environment 115 use inter-processor interrupts to coordinate memory access changes rather than wait. Inter-processor interrupts (IPI) are asynchronous with respect to the receiving processor's instruction stream and therefore cannot be used without synchronization logic in a duplicated fault tolerant system. In a replay system, however, the goal is to reproduce the original results (reproduce the instruction stream ordering). A non-deterministic process can be used to order the original results as long as the reproduction is faithfully done during the replay. In general, a continuous replay system executes a collection of instruction streams on a set of processors (a master set of processors) starting from an initial processor and memory state and consuming an input stream. This produces a new processor and memory state, an output stream, and a journal entry indicating the interactions between the various instruction streams. One or more second set of processors (each of which is a slave set of processors) starting with the same processor state, memory state, and input stream can be coordinated using the journal stream. Based on the directions in the journal stream, this second set of processors produces the same end processor state, memory state, and output stream. This alignment can be verified by the slave processors.

Figure 11:
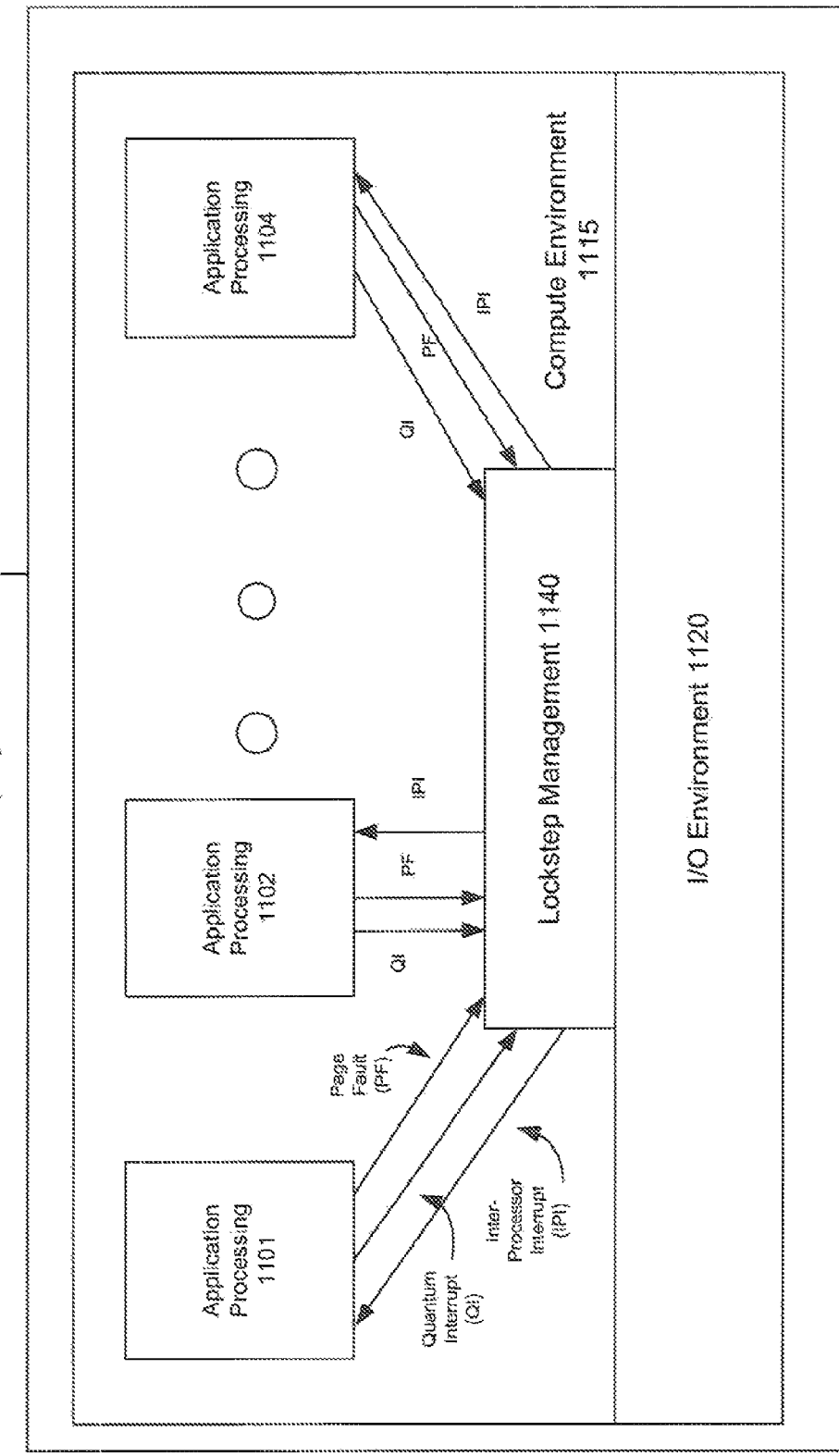

A continuous replay fault tolerant system can be represented by the components of FIG. 1. For this discussion, server 110 performs the initial processing and server 160 performs the replay. FIG. 11 shows replay server 1100 (which may be an implementation of server 160 of FIG. 1), which has application processes 1101, 1102 . . . 1104 and lockstep management 1140 interface. Three techniques that may be used to coordinate the application processes on server 1110 involve page faults (PF), quantum interrupts (QI), and inter-processor interrupts (IPI). The PF and QI mechanisms have been described previously. The IPI mechanism is used to avoid waiting for either a PF or a QI on the other processors. When a processor page faults, lockstep management 1140 sends an IPI to the other processors to effectively breakpoint the other processors. Lockstep management 1140 records the processor instruction stream (e.g., program counter and quantum counter) of each processor to the journal stream, resolves the page conflict, reloads the quantum counter, and resumes application processing. The replay on server 1160 is performed using the journal stream without the use of IPIs. For each entry in the journal stream produced by server 110, there is record for each processor and a record for input consumption. Each processor record includes three major items: a quantum target, an instruction pointer, and an access resolution. The quantum target is the value to load in the quantum counter to get a processor in server 160 to stop where that corresponding processor in server 110 stopped. If the processor stopped via a page fault, the quantum target is large enough to allow the page fault to occur again. The instruction pointer is there to verify that the replay on server 160 is following the same sequence as server 110. The access resolution is the page access rights that need to be modified before execution begins again. The input consumption record indicates what input sequences were applied to the collective processor state and how time advanced. The processor records are described in the following discussions.

Figure 12:
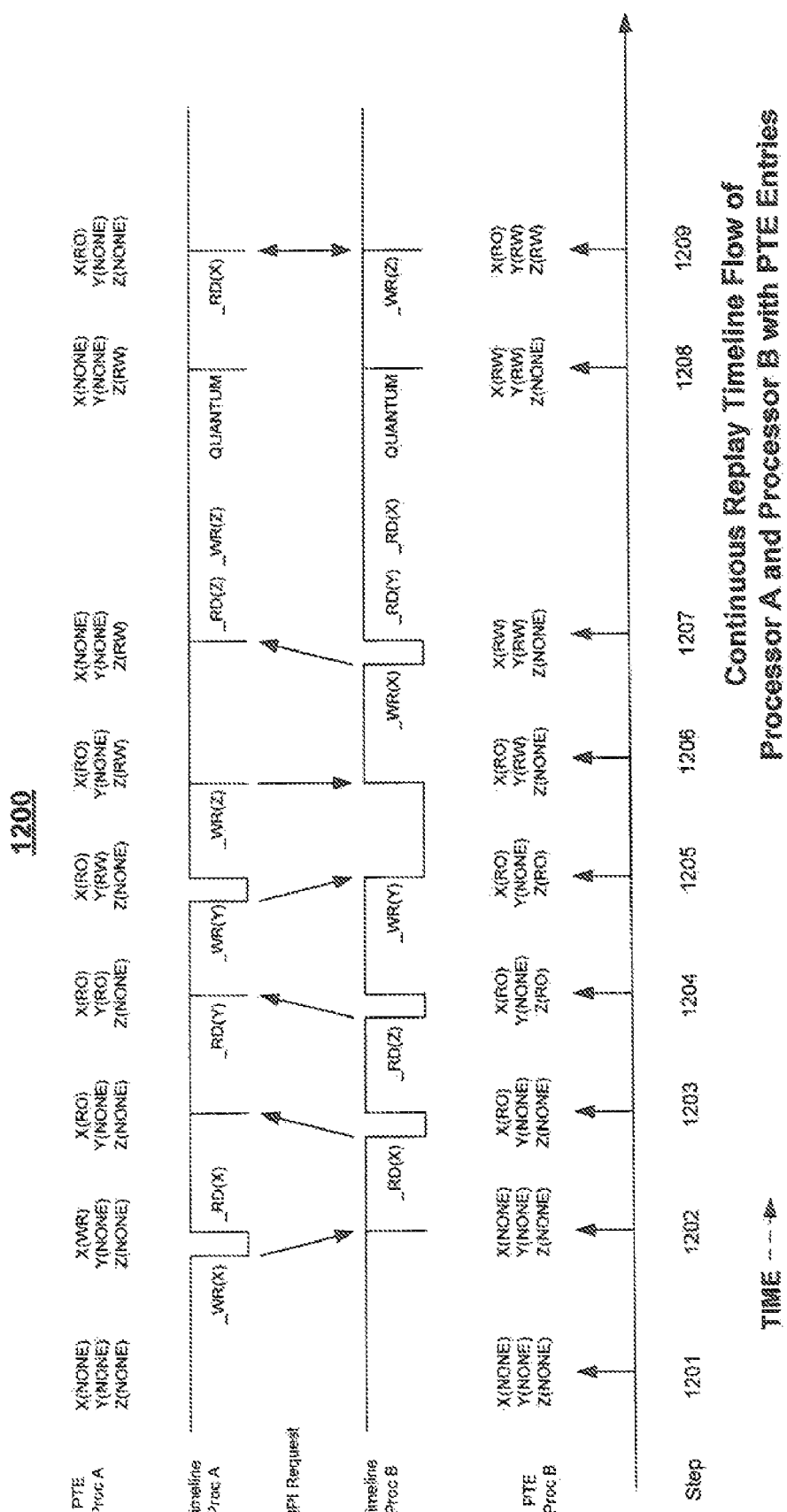
Figure 14:
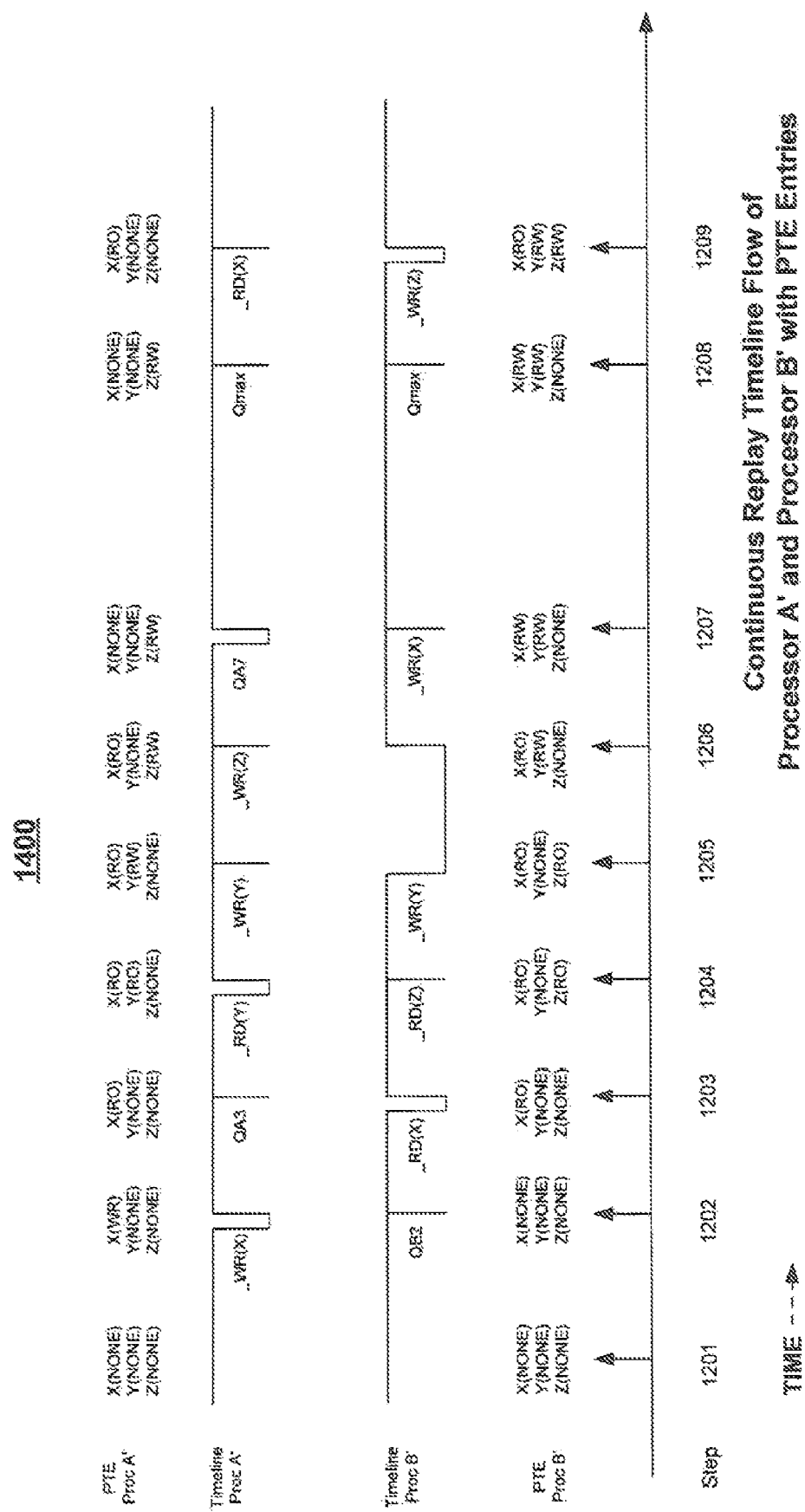

FIGS. 12 and 14 show a sequence of instruction stream interactions 1200 and 1400, respectively, with a two processor SMP system. The sequence of FIG. 12 is captured from server 110 of a replay system, and the sequence of FIG. 14 is captured from server 160 of a replay system as the server 160 executes the replay. The DSMA state transitions as depicted in FIG. 10 are also valid for both servers 110 and 160 of a replay system. FIG. 13 shows the journal stream minus the input consumption record that is created by the interactions 1200 of FIG. 12 and used to create the interactions 1400 of FIG. 14.

FIG. 12 shows the interactions 1200 between two processors A and B when traps are coordinated based on PTE access. Similar processes occur at the various levels of the page table structure. The interactions 1200 occur in the context in which all pages start off as no access, as is the case for pages not in memory when a task first starts executing. In contract, for a thread that is spawned, the PTE is likely to start off with Read Only access for most of its entries. When the processor timeline is "High", the processor is executing. When the processor timeline is "Low", the processor is stalled. Walking through the steps in FIG. 12:

Step 1201:
No access by either processor to any of pages X, Y, Z.
Step 1202:
Proc A attempts Write X with no privilege. An IPI is sent to Proc B.
Proc B stops due to the IPI.
Proc A is given Read/Write to page X (exclusive).
Proc B continues with no access to pages X, Y, Z.
Step 1203:
Proc B attempts Read X with no privilege. An IPI is sent to Proc A.
Proc A stops due to the IPI.
Proc A is downgraded to Read Only X (shared).
Proc B is given Read Only X (shared).
Step 1204:
Proc B attempts Read Z with no privilege. An IPI is sent to Proc A.
Proc A attempts to Read Y with no privilege.
Proc A is given Read Only Y (shared). The IPI from Proc B is dismissed.
Proc B is given Read Only Z (shared).
Step 1205:
Proc A attempts Write Y with no privilege. An IPI is sent to Proc B.
Proc B attempts Write Y with no privilege.
Proc A is given Read/Write Y (exclusive).

Proc B is stalled waiting for Y access. The IPI from Proc A is dismissed

Step 1206:

Proc A attempts Write Z with no privilege. An IPI is sent to Proc B.

Proc B is stalled waiting Y access.

Proc A is given None Y and Read/Write Z (exclusive).

Proc B is given Read/Write Y (exclusive) and None Z. The IPI from Proc A is dismissed.

Step 1207:

Proc B attempts Write X with no privilege. An IPI is sent to Proc A.

Proc A stops due to the IPI.

Proc A is downgraded to None X.

Proc B is given Read/Write X (exclusive).

Step 1208:

Proc A stops due to Quantum.

Proc B stops due to Quantum.

Proc A continues with no change.

Proc B continues with no change.

Step 1209:

Proc A attempts Read X with no privilege. An IPI is sent to Proc B.

Proc B attempts Write Z with no privilege. An IPI is sent to Proc A.

Proc A is given Read Only X (shared) and None Z. The IPI from B is dismissed.

Proc B is given Read Only X (shared) and Read/Write Z (exclusive). The IPI from A is dismissed.

At each step in FIG. 12, a journal entry is created outlining the interactions between the processors. FIG. 13 shows a possible journal stream 1300 for the sequence in FIG. 12. In FIG. 13, the Step column 1310 is the step number corresponding to the above description for FIG. 12. The Quantum column 1320A or 1320B represents the value that is to be loaded in the quantum counter before execution begins. A value of (P,QA2+1) in step 1202 for Processor A indicates that Processor A stopped with a page fault after executing a quantum of QA2. The counter is set at least one larger to allow the replay to reach the same page fault. A value of (I,Qmax) as in step 1208 for both processors A and B indicates that the processors were stopped by the quantum interrupt. A value of (I,QA3) as in step 1203 for processor A indicates that this is where the processor stopped due to an IPI. For the replay server 760, there is no difference between stopping due to an IPI verses due to a Quantum Interrupt. The PC column 1330A or 1330B represents the program counter value where the processor stopped. In the case of a page fault (step 1202 for processor A), the PC value points to the instruction that trapped with the access violation. In the case of an IPI or a Quantum Interrupt, the PC value is the next instruction to be executed. The ACCESS column 1340A or 1340B shows the changes that were applied to the paging structure before execution continues.

Processors A and B are referred to as Proc A and Proc B for server 110 in the timeline of FIG. 12, and as Proc A' and Proc B' for server 160 in the timeline of FIG. 14. The timeline of FIG. 12 is reproduced as FIG. 14 by following the instructions as outlined in the journal file of FIG. 13.

Step 1201:

Proc A' starts at instruction A1 and is given NONE X, NONE Y, and NONE Z.

Proc B' starts at instruction B1 and is given NONE X, NONE Y, and NONE Z.

Step 1202:

Proc A' loads Quantum QA2+1 and runs until it attempts to Write X without privilege at instruction A2.

Proc B' loads Quantum QB2 and runs until the quantum expires at instruction B2.

Proc A' is given READ/WRITE X (exclusive).

Proc B' is given no change.

Step 1203:

Proc A' loads Quantum QA3 and runs until the quantum expires at instruction A3.

Proc B' loads Quantum QB3+1 and runs until it attempts to Read X without privilege at instruction B3.

Proc A' is given READ ONLY X (shared).

Proc B' is given READ ONLY X (shared).

Step 1204:

Proc A' loads Quantum QA4+1 and runs until it attempts to Read Y without privilege at instruction A4.

Proc B' loads Quantum QB4+1 and runs until it attempts to Read Z without privilege at instruction B4.

Proc A' is given READ ONLY Y (shared).

Proc B' is given READ ONLY Z (shared).

Step 1205:

Proc A' loads Quantum QA5+1 and runs until it attempts to Write Y without privilege at instruction A5.

Proc B' loads Quantum QB5+1 and runs until it attempts to Write Y without privilege at instruction B5.

Proc A' is given READ/WRITE Y (exclusive).

Proc B' is given no change.

Step 1206:

Proc A' loads Quantum QA6+1 and runs until it attempts to Write Z without privilege at instruction A6.

Proc B' stalls at instruction B5.

Proc A' is given NONE Y and READ/WRITE Z (exclusive).

Proc B' is given READ/WRITE Y (exclusive) and NONE Z.

Step 1207:

Proc A' loads Quantum QA7 and runs until the quantum expires at instruction A7.

Proc B' loads Quantum QB7+1 and runs until it attempts to Write X without privilege at instruction B7.

Proc A' is given NONE X.

Proc B' is given READ/WRITE X (exclusive).

Step 1208:

Proc A' loads Quantum Qmax and runs until the quantum expires at instruction A8.

Proc B' loads Quantum Qmax and runs until the quantum expires at instruction B8.

Proc A' is given no change.

Proc B' is given no change.

Step 1209:

Proc A' loads Quantum QA9+1 and runs until it attempts to Read X without privilege at instruction A9.

Proc B' loads Quantum QB9+1 and runs until it attempts to Write Z without privilege at instruction B9.

Proc A' is given READ ONLY X (shared) and NONE Z.

Proc B' is given READ ONLY X (shared) and READ/WRITE Z (exclusive).

The timelines of FIG. 12 and FIG. 14, while similar, are not the same. Since the application processing of servers 110 and 160 is running in a loose instruction lockstep, the wall clock time required to execute a sequence of instructions varies between the server 110 and 160. The order of events may in some cases attempt to reverse themselves during replay. For example, in step 1205 of FIG. 12, Processor A on server 110 attempts a WRITE access to page Y before Processor B. During the replay on server 160, Processor B' attempts the WRITE access to page Y before Processor A'. The journal stream for step 1205, FIG. 13, dictates that Processor A gets the READ/WRITE access to page Y. Step 1206 of the journal stream has the quantum for Processor B being ZERO, indicating that Processor B' stalls for that cycle of the replay. This enforces the original order as seen in server 110 onto Processor A' and B'. Other nearly simultaneous accesses may be masked by the fact that the quantum value may stop a processor just before the processor makes an access, similar to the way the IPI did on server 110. Using step 1205 as an example again, if the IPI interrupt had arrived at Processor B one instruction sooner, Processor B would not be making a write access violation to page X at instruction B5 but would have stopped one instruction sooner at B5-1. The journal entry for Processor B at step 1205 would then be Quorum=(I,QB5) with PC=B5-1; stopped due to an IPI one instruction sooner. The replay would then force Processor B' in server 160 to stop at B5-1, just like server 110 did.

The difference between timelines FIG. 12 and FIG. 14 may only be in the wall clock time it takes to execute the instruction sequences. The processors in server 160 should not exhibit a different behavior from the processors in server 110. Two or more processors engaged in a test and wait loop experience exactly the same behavior between server 110 and server 160—namely, number of reads, values read, ordering of writes, and values written are identical.

The execution sequence of server 110 that produced the continuous replay of FIG. 12 is controlled by the same rules that server 110 used to produce the duplication system of FIG. 8. All of the alternate methods of access control for the duplication system apply to server 110 in a continuous replay system. Since server 160 in a continuous replay system simply follows the trail left behind in the journal stream, an additional policy can be added that would be non-deterministic in the duplication system:

In a system with 3 or more processors, only the processors in access conflict are stalled to resolve the conflict. The other processors continue executing until their quantum expires or until they have an access conflict with another processor. For example, processors A & B are in state READ ONLY 1020 (J(RO)) for page J. Processor C is in state NONE 1010 for page J (J(NONE)). Processors A & B both need to transition to state READ/WRITE 1030 to gain J(RW) for page J. Processor C does not need access to page J. Only processors A & B need to stall in order to resolve the conflict.

An advantage in a continuous replay system is that using an IPI to quickly resolve access conflicts can improve system performance. In general, input can only be delivered when all processors are in a stalled state; otherwise, the delivery becomes a non-deterministic event. Time (which is an input) can only change when all processors are in a stalled state. A problematic combination of tasks is an application that generates many page faults coupled with an application that is memory bound and compute intensive. In a duplication system, the Qmax value needs to be small to prevent the page fault application from stalling while waiting for the compute intensive task to finish its Qmax quantum, but not so small as to consume the processors with overhead. In a continuous replay system, the page faults and IPIs track the applications. In fact, stalls can be used to enforce a minimum spacing of page faults while the Qmax value regulates the granularity for input delivery.

Virtual Address Translation

A further discussion about virtual translation structures is presented here. The hardware mechanism to support virtual address translation follows the table structure as shown in FIG. 3. There is no required correlation between virtual address and physical address except what is included in the translation tables. The operating system executes in virtual address space but is required to build the translation tables for hardware use that include physical addresses. The operating system needs to understand how to transition between virtual and physical in order to maintain the translation tables. This may be accomplished by the techniques:

1) The virtual address space of the Page Tables (PT) are linearly contiguous.
2) The Page Directory (PD) is virtually mapped at a fixed location.
3) The PD is also used as a PT with a self-mapping PDE/PTE.

For the 32 bit Windows operating systems from Microsoft, the three addresses are:

1) The PTs are virtually mapped starting at C000_0000.
2) The PD is virtually mapped at C030_0000.
3) The self-mapped PDE/PTE is at virtual address C030_0C00.

A person skilled in operating system (OS) memory management can use these facts to translate any virtual address into a physical address. Additionally, one so skilled can "walk" the page table structures and completely identify the virtual and physical addresses of the structures themselves and also identify all the physical memory that is addressable by that structure. A set of addressing equations can be made for accessing any portion of the translation structure:

$$\text{PDindex} = va\langle 31{:}12\rangle {>}{>}{>}22 \qquad \text{EQU 1)}$$

which represents the index into the PD is bits 31 through 12 of the virtual address right shifted by 22 bits. This is a dword (4 byte) index.

$$\text{PTindex} = va\langle 21{:}12\rangle {>}{>}{>}12 \qquad \text{EQU 2)}$$

which represents the index into the PT is bits 21 through 12 of the virtual address right shifted by 12 bits. This is a dword (4 byte) index.

$$\text{PGindex} = va\langle 11{:}00\rangle \qquad \text{EQU 3)}$$

which represents the index into the page of memory is bits 11 through 00. This is a byte index.

$$VA_{PD}(va) = \text{C030\_0000} \qquad \text{EQU 4)}$$

which represents the the virtual address of the page directory (PD) given any virtual address (va) is C030_0000 by definition.

$$PA_{PD}(va) = \text{Mem}[\text{C030\_0C00}]\langle 31{:}12\rangle \qquad \text{EQU 5)}$$

which represents the the physical address of the PD is bits 31 through 12 of the contents of memory at virtual address C030_0C00.

$$VA_{PDE}(va) = \text{C030\_0000} + (\text{PDindex} {<}{<} 2) \qquad \text{EQU 6)}$$

which represents the the virtual address of the page directory entry (PDE).

$$PA_{PDE}(va) = PA_{PD}(va) + (\text{PDindex} {<}{<} 2) \qquad \text{EQU 7)}$$

which represents the the physical address of the PDE is the physical address of the PD plus the byte index of the PDindex.

$$VA_{PT}(va) = \text{C000\_0000} + (\text{PDindex} {<}{<} 12) \qquad \text{EQU 8)}$$

which represents the the virtual address of the page table (PT) by definition.

$$PA_{PT}(va) = \text{Mem}[VA_{PDE}(va)]\langle 31{:}12\rangle \qquad \text{EQU 9)}$$

which represents the the physical address of the PT is included in bits $\langle 31{:}12\rangle$ of the memory location at $VA_{PDE}(va)$.

$$VA_{PTE}(va) = VA_{PT(va)} + (\text{PTindex} {<}{<} 2). \qquad \text{EQU 10)}$$

$$PA_{PTE}(va)=PA_{PT}(va)+(PTindex<<2). \quad \text{EQU 11)}$$

$$VA_{Page}(va)=(PDindex<<22)+(PTindex<<12) \quad \text{EQU 12)}$$

by definition.

$$PA_{Page}(va)=Mem[VA_{PTE}(va)]<31:12>. \quad \text{EQU 13)}$$

$$VA_{Byte}(va)=VA_{Page}(va)+PGindex=va \quad \text{EQU 14)}$$

by definition.

$$PA_{Byte}(va)=PA_{Page}(va)+PGindex. \quad \text{EQU 15)}$$

$$Data(va)=Mem[va]. \quad \text{EQU 16)}$$

The significant point in this collection of equations is reliance by the operating system on the existence of the following specific virtual addresses:
1) C000_0000—the virtual address of the linearly mapped page tables.
2) C030_0000—the virtual address of the Page Directory (PD) is also a Page Table (PT).
3) C030_0C00—the virtual address of the self-mapped PDE/PTE.

When setting an alternate page table structure, the dual use of the PT at C030_0000 as a PD and the dual use of entry 300 (virtual address C030_0C00) as both a Page Table Entry (PTE) and as a Page Directory Entry (PDE) should be considered.

A set of example address translations is shown using the operating system's page table structure. A second set of examples walks through the same translations using shadow page tables.

From the above equations the various translations for the virtual address E829_6457 is be shown:
1) PDindex=va<31:12>>>22=3A0.
2) PTindex=va<21:12>>>12=296.
3) PGindex=va<11:00>=457.
4) VA$_{PD}$(va)=C030_0000—by definition.
5) PA$_{PD}$(va)=Mem[C030_0C00]<31:12>.
6) VA$_{PDE}$(va)=C030_0000+(PDindex<<2)=C030_0000+E80=C030_0E80.
7) PA$_{PDE}$(va)=PA$_{PD}$(va)+(PDindex<<2)=PA$_{PD}$(va)+E80.
8) VA$_{PT}$(va)=C000_0000+(PDindex<<12)=C000_0000+3A_0000=C03A_0000.
9) PA$_{PT}$(va)=Mem[VA$_{PDE}$(va)]<31:12>.
10) VA$_{PTE}$(va)=VA$_{PT}$(va)+(PTindex<<2)=C03A_0000+558=C03A_0558.
11) PA$_{PTE}$(va)=PA$_{PT}$(va)+(PTindex<<2)=PA$_{PT}$(va)+558.
12) VA$_{Page}$(va)=(PDindex<<22)+(PTindex<<12)=E800_0000+29_6000=E829_6000.
13) PA$_{Page}$(va)=Mem[VA$_{PTE}$(va)]<31:12>.
14) VA$_{Byte}$(va)=VA$_{Page}$(va)+Byte Index=va=E829_6000+457=E829_6457.
15) PA$_{Byte}$(va)=PA$_{Page}$(va)+Byte Index=PA$_{Page}$(va)+457.
16) Data=Mem[va].

Figure 15:
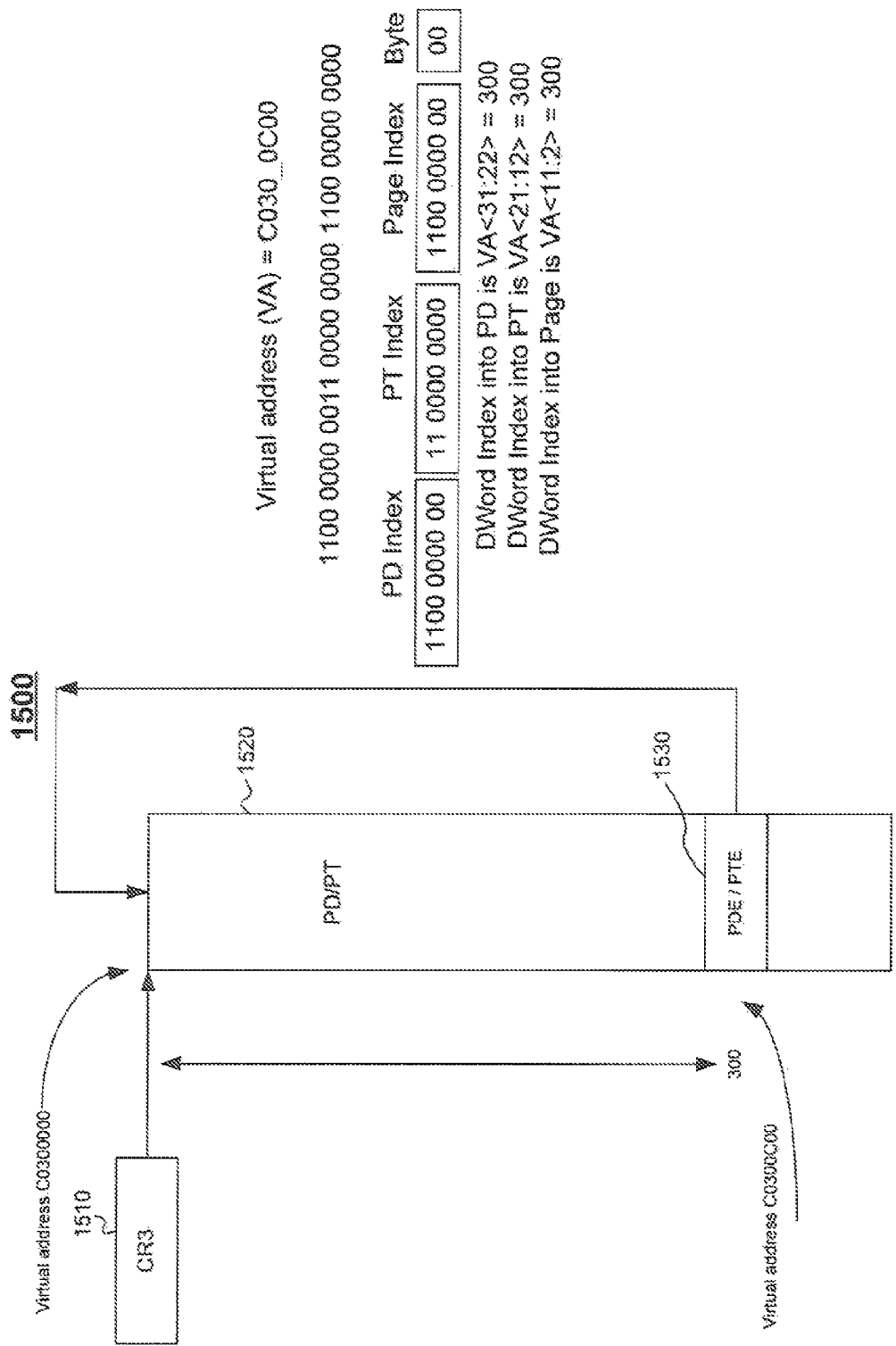

Referring to FIG. 15, an example 1500 illustrates applying hardware translation techniques to translate PA$_{PD}$(va)=Mem[C030_0C00]<31:12>. The CR3 register is loaded with the physical translation of virtual address C030_0000. Also, the dword at index 300 is loaded with the same physical address as is in CR3. Following the hardware translation process:
1) The physical address in CR3 1510 is used as the pointer to the base of the PD.
2) Bits <31:22> of the virtual address C030_0C00 (=300) are used as a dword index into the PD to find the PDE 1530.
3) The PDE 1530 points (physical address) to the base of the PT.

This is the same physical address as obtained from CR3.
4) Bits <21:12> of the virtual address C030_0C00 (=300) are used as a dword index into the PT to find the PTE 1530.
5) The PTE 1530 points (physical address) to the base of the memory page. This is the same physical address as obtained from CR3.
6) Bits <11:02> of the virtual address C030_0C00 (=300) are used as a dword index into the page of memory.
7) Reading this dword of memory yields the physical address of base of the PD 1520. This is the PA$_{PD}$(va).

Figure 16:
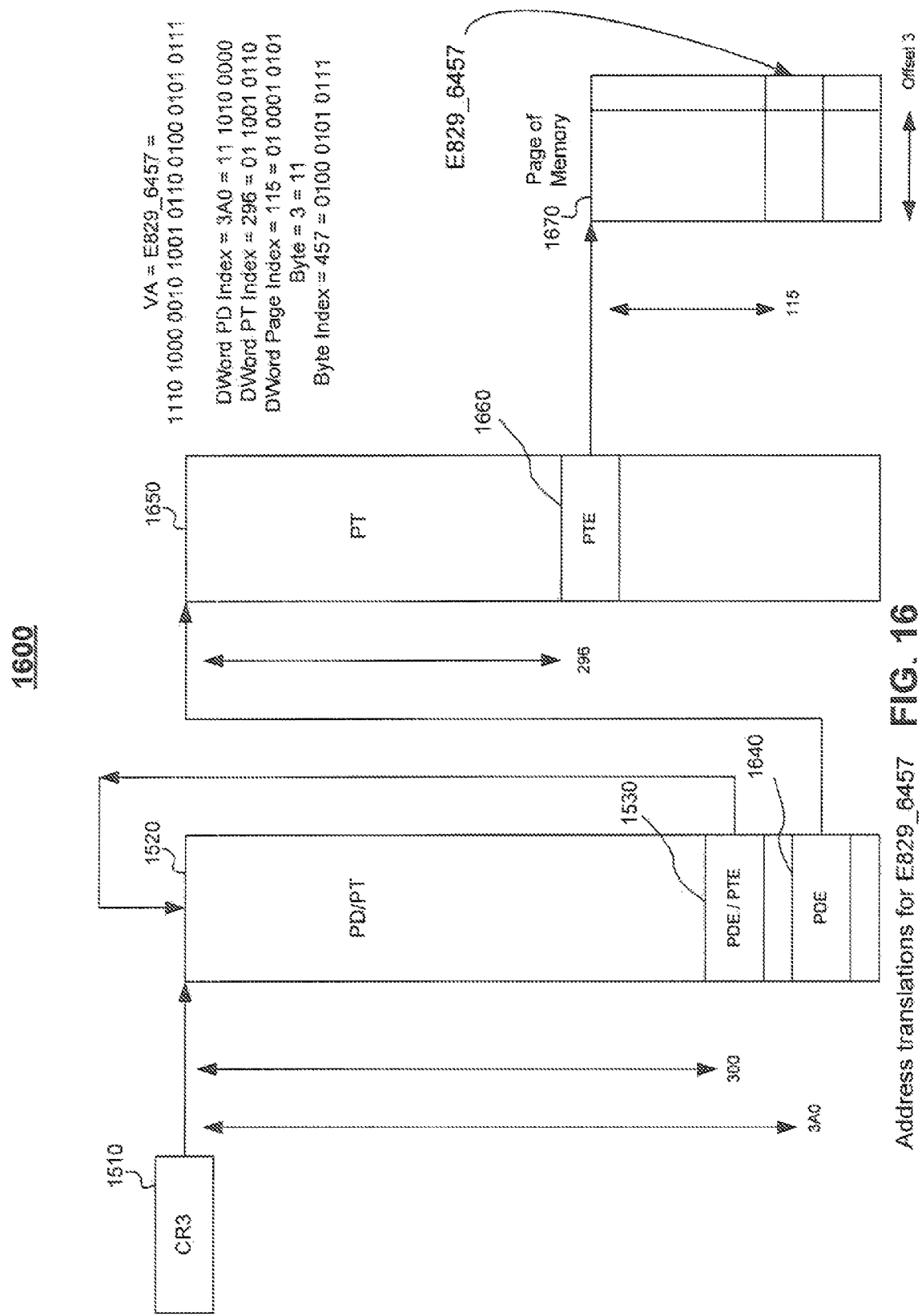

Referring also to FIG. 16, hardware translation techniques are applied to translate PA$_{PT}$(va)=Mem[VA$_{PDE}$(va)]<31:12> for va=E829_6457:
1) VA$_{PDE}$(va)=C030_0000+(PDindex<<2)=C030_0000+E80=C030_0E80.
2) The physical address in CR3 1510 is used as the pointer to the base of the PD 1520.
3) Bits <31:22> of the virtual address C030_0E80 (=300) are used as a dword index into the PD 1510 to find the PDE 1530.
4) The PDE 1530 points (physical address) to the base of the PT 1520.
5) Bits <21:12> of the virtual address C030_0E80 (=300) are used as a dword index into the PT 1520 to find the PTE 1530.
6) The PTE 1530 points (physical address) to the base of the memory page 1520.
7) Bits <11:02> of the virtual address C030_0E80 (=3A0) are used as a dword index into the page of memory 1640.
8) Reading this dword of memory yields PDE for PDindex 3A0 which is the physical address of the base of the PT. This is the PA$_{PT}$(va)=Mem[VA$_{PDE}$(va)].

Referring again to FIG. 16, hardware translation techniques are applied to translate PA$_{Page}$(va)=Mem[VA$_{PTE}$(va)]<31:12> for va=E829_6457:
1) VA$_{PTE}$(va)=VA$_{PT}$(va)+(PTindex<<2)=C03A_0000+558=C03A_0558.
2) The physical address in CR3 1510 is used as the pointer to the base of the PD 1520.
3) Bits <31:22> of the virtual address C03A_0558 (=300) are used as a dword index into the PD 1520 to find the PDE 1530.
4) The PDE 1530 points (physical address) to the base of the PT 1520.
5) Bits <21:12> of the virtual address C03A_0558 (=3A0) are used as a dword index into the PT 1520 to find the PTE 1640.
6) The PTE 1640 points (physical address) to the base of the memory page 1650.
7) Bits <11:02> of the virtual address C03A_0558 (=296) are used as a dword index into the page of memory 1650 yielding memory location 1660.
8) Reading this dword of memory yields PTE for PTindex 296 which is the physical address of the memory page. This is the PA$_{Page}$(va)=Mem[VA$_{PTE}$(va)].

Referring again to FIG. 16, hardware translation techniques are applied to translate Data=Mem[va] for va=E829_6457:
1) The physical address in CR3 1510 is used as the pointer to the base of the PD 1520.
2) Bits <31:22> of the virtual address E829_6457 (=3A0) are used as a dword index into the PD 1520 to find the PDE 1640.
3) The PDE points (physical address) to the base of the PT 1650.

4) Bits <21:12> of the virtual address E829_6457 (=296) are used as a dword index into the PT 1650 to find the PTE 1660.
5) The PTE 1660 points (physical address) to the base of the memory page 1670.
6) Bits <11:00> of the virtual address E829_6457 (=457) are used as a byte index into the page of memory 1670.
7) This is the Data=Mem[va].

Shadow Page Table Virtual Address Translation

The goal in creating a shadow page table structure is to allow per processor deterministic shared memory access control. The shadow mapping directs the processor to exactly the same pages of physical memory as the original page table structure do. Additionally, note that any pages of memory that are being used in the original translation structure as Page Tables (PT) or as a Page Directory (PD) should be translated in the original translation structure and appear as Page Table Entries (PTE). The shadow page tables should map all pages that were included in the original translation structure.

Figure 17:
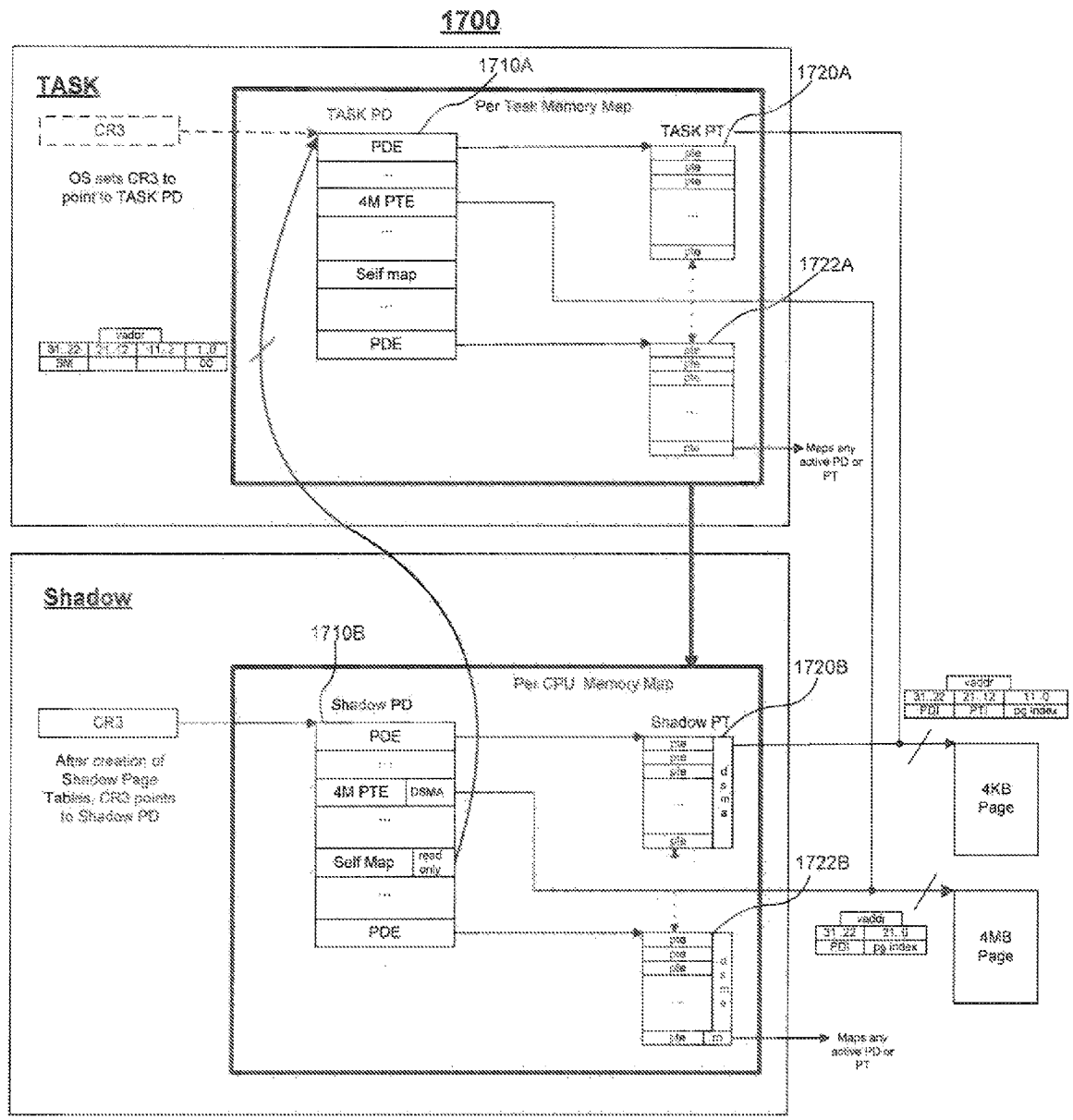

FIG. 17 shows an overview 1700 of the combined Task paging structure and the Shadow paging structure shown in FIGS. 7 and 8, respectively. Shown in the task paging structure are the Task PD 1710A and two Task PTs 1720A and 1722A. As an example, the Task PD 1710A shows the Self Map PDE/PTE, a 4M PTE, and two PDEs,. The Shadow PD 1710B shows the same items as the Task PD 1710A. The use of the Task Self Map PDE/PTE was explained previously. The Shadow Self Map PDE/PTE is set to point to the Task PD 1710A so that any use of the Self Map PDE/PTE by the task produces the correct address translation. The Shadow Self Map PDE/PTE entry is marked as read only. This guarantees that any attempt by the operating system to modify the Task translation structure generates a page fault. The shadow page tables can then be modified accordingly. In addition, the shadow PTs 1720B and 1722B correspond to Task PTs 1720B and 1722B.

The 4M PTE is a single level mapping where the PD points directly to a 4 megabyte page of physical memory without using a PT in the translation process. The Task and the Shadow 4M PTE entries both point to the same physical address space. The DSMA field shown in the Shadow 4M PTE includes the R/W and Present bits that are being manipulated to guarantee that a single CPU has write privileges.

The Task PDE entries and the Shadow PDE entries point to corresponding Task and Shadow PTs. A corresponding PTE in the Task PT and in the Shadow PT both point to the same 4 KB page of physical memory, The Shadow PTE includes a DSMA field to control write access.

Logically, the creation of the shadow page table structure can be thought of as identifying every PDE and PTE in a translation structure as in FIG. 7 and creating a shadow table structure as in FIG. 8. Whenever the operating system modifies one of the table structures in FIG. 7, the corresponding change should be made in FIG. 8. The shadow translation structure does not need to be created all at once. When the operating system sets up a task, the complete map of a task's currently accessible address space is set up in the Task PD and Task PTs. The task CR3 value is then loaded and task execution is started. The minimalist approach is to build the shadow page table structure as it is needed. Between the loading of the task CR3 value and the execution of the task's first instruction, the shadow PD can be created with CR3 pointing to the shadow PD. All entries can have their DSMA field set to not present. Access to pages of memory not yet mapped in the shadow translation tables causes a page fault. On each page fault, the shadow translation tables can be expanded to handle that fault.

Over time, the shadow translation tables expand to cover the memory being referenced by the task. This is by definition the working set of the task for that time period. When the operating system swaps tasks assigned to this CPU, the CR3 value are changed to point to a new task paging structure. The shadow paging structure is torn down and a new one created to reflect the new task paging structure. Optimizations that can be applied to this process are:

Preserve portions of the shadow paging structure that are identical between tasks. For example, portions of the operating system address space are identically mapped across all tasks.

The first time a PT is referenced, populate groups (up to the complete PT) of PTE entries in the shadow PT. This is trading off page fault overhead versus the time to speculatively create sections of the shadow paging structure.

Trim the shadow paging structure over time. The locality of reference of a task changes over time leaving many unused pages in the paging structure. Having fairly small active shadow paging structures can improve the performance of the processes used to maintain the DSMA state of FIG. 10 across multiple CPUs. Additionally, a small shadow paging structure can be quickly torn down on a task swap.

The active working set for a task can be tracked while the task executes. The working set is remembered while the task is no longer executing on a processor. When a task is swapped back onto a processor, the shadow paging structure representing the working set for the task can be populated to avoid a the sequence of page faults required to initialize the shadow paging structure.

Nested Page Table Usage

Figure 18:
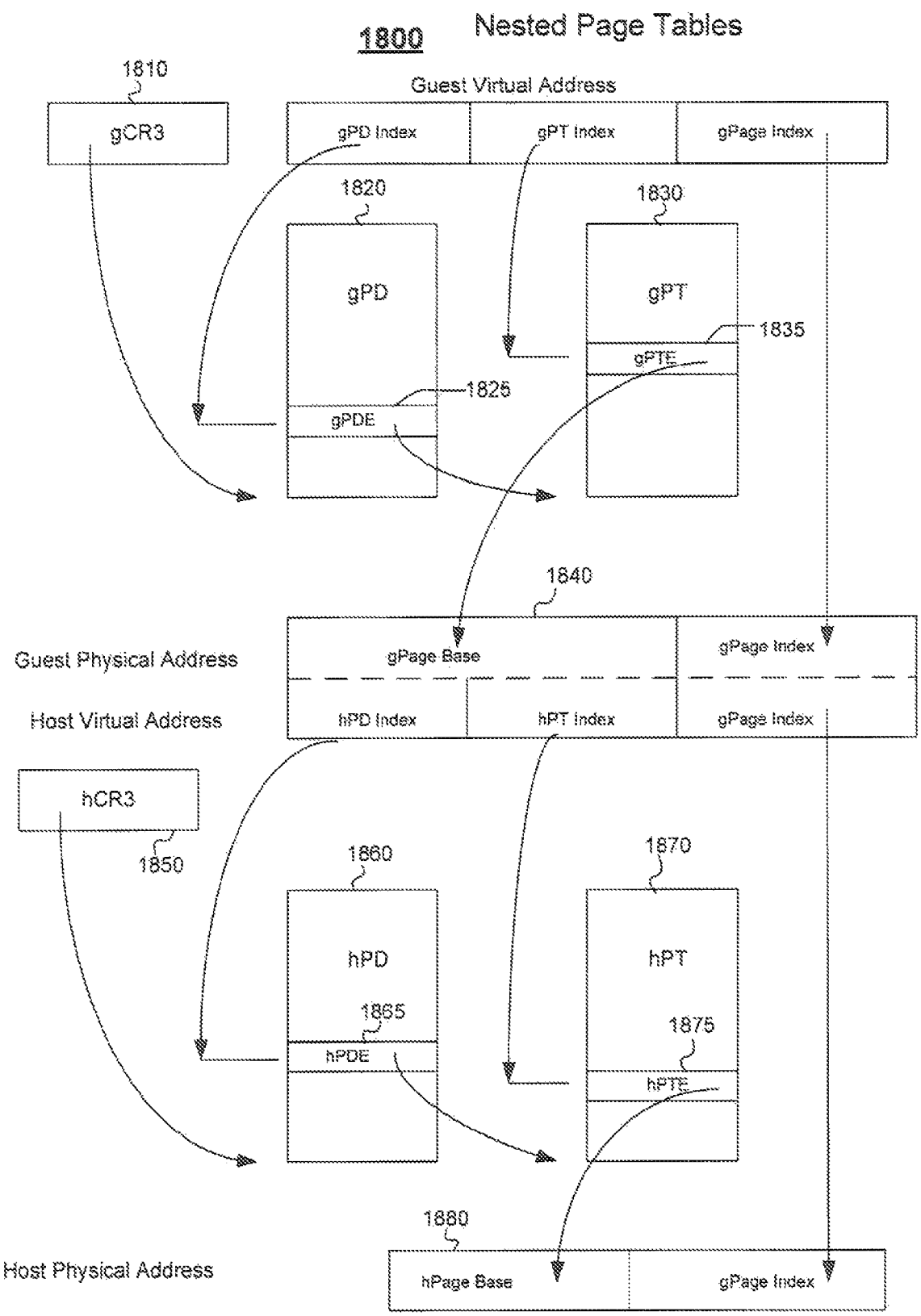

A nested page table memory management structure 1800 is shown in FIG. 18. A guest virtual address is translated by the following steps:

The guest CR3 (gCR3) 1810 register points to the base of the guest page directory (gPD) 1820.

The guest PD index (gPD Index) from the guest virtual address identifies the guest PDE (gPDE) 1825.

The gPDE 1825 points to the base of the guest page table (gPT) 1830.

The guest PT index (gPT Index) from the guest virtual address identifies the guest PTE (gPTE) 1835.

The gPTE 1835 points to the base of the guest page 1840 of physical memory (gPage Base).

The complete guest physical address is gPage Base plus the gPage Index from the guest virtual address. This is used as the host virtual address.

The host CR3 (hCR3) 1850 register points to the base of the host page directory (hPD) 1860.

The host PD index (hPD Index) from the host virtual address identifies the host PDE (hPDE) 1865.

The hPDE 1865 points to the base of the host page table (hPT) 1870.

The host PT index (hPT Index) from the host virtual address identifies the host PTE (hPTE) 1875.

The hPTE 1875 points to the base of the host page 1880 of physical memory (hPage Base).

The complete host physical address is the hPage Base plus the gPage Index from the guest/host virtual address.

Since this structure is present for every processor in the system, a unique address translation path from guest virtual to host physical can be easily created manipulating only the host part of the translation structure. Each processor in a SMP guest operating system is allowed to directly manipulate the guest translation structures with the host translation structure being used to coordinate DSMA privileges.

Figure 19:
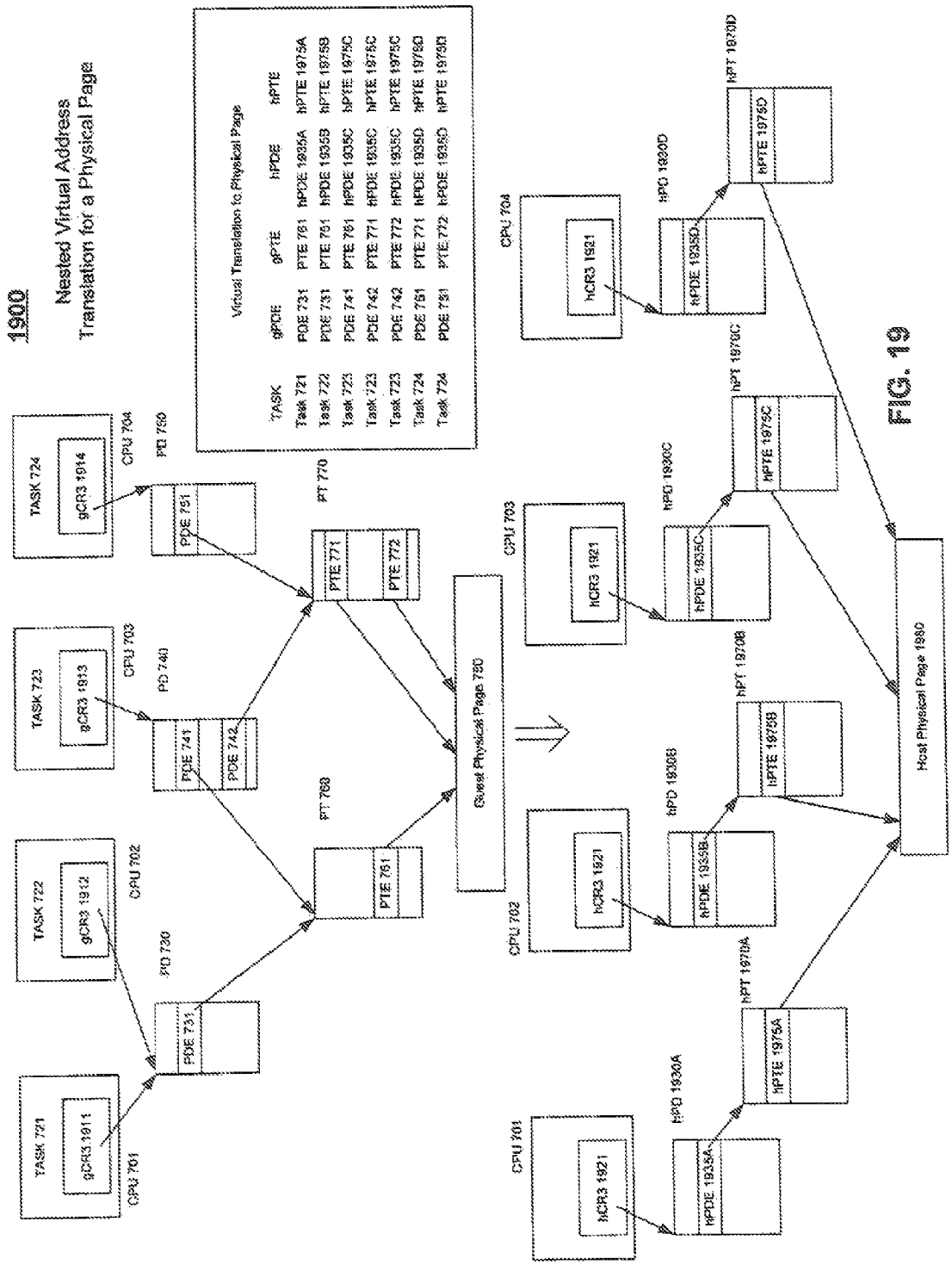

FIG. 19 shows the virtual address translation from FIG. 7 configured using nested page tables. What is shown is all the virtual to physical mappings for a single physical page of memory for four tasks that are simultaneously running on a four processor SMP system. There are two phases to the virtual to physical address translation. In phase one, a guest virtual address is translated into a guest physical address. In phase two, the guest physical address is translated into a host physical address. Since FIG. 19 represents all the mappings for a single physical page, there is only one host physical address. The page table structure being used by the guest operating system is unmodified from the structure of FIG. 7. The guest operating system page tables are not modified in any way. There is one copy of the host translation table structure for each processor in the system. The host translation structure is a one to one mapping; one host physical address for every possible guest physical address. The host translation tables are logically equivalent but unique. FIG. 19 represents seven unique mappings to host physical address 1980. All seven mapping share a common guest physical memory page 780 and a common host physical memory page 1980, yet none of the mappings share a common element in the host translation tables. The uniqueness on the host translation side allows page access privileges to be manipulated.

As shown in FIG. 18, the guest virtual address is broken into three indexes (gPD Index, gPT Index, and gPage Index). The gPD Index and the gPT Index are uniquely identified by the gPDE and gPTE respectively. Therefore, referring to FIG. 19, the guest virtual address spaces mapped for each task can be written as:

Guest mapping 1 for Task 521=PDE 531 PTE 561
Guest mapping 2 for Task 522=PDE 531 PTE 561
Guest mapping 3 for Task 523=PDE 541 PTE 561
Guest mapping 4 for Task 523=PDE 542 PTE 571
Guest mapping 5 for Task 523=PDE 542 PTE 572
Guest mapping 6 for Task 524=PDE 551 PTE 571
Guest mapping 7 for Task 524=PDE 551 PTE 572

The above shows six unique guest virtual addresses (Task 521 and Task 522 have the same virtual address space), all mapping to one guest physical page 580. Guest physical page 580 has four defined mappings, one for each processor in the system. All four mapping translate to the same host physical memory page 1980. The host physical address space can be written as:

Host mapping 1 on CPU 501=hPDE 1935A hPTE 1975A
Host mapping 2 on CPU 502=hPDE 1935B hPTE 1975B
Host mapping 3 on CPU 503=hPDE 1935C hPTE 1975C
Host mapping 4 on CPU 504=hPDE 1935D hPTE 1975D

The guest virtual address translation is based on guest translation tables which are specific to a task. When the guest operating system moves a task from one CPU to another, the guest translation tables move with the task. The mapping from guest virtual address to guest physical address is task specific. The host translation tables are CPU specific only because the access rights from any CPU to a page of memory are being control to make the access deterministic. The collection of host translation tables guarantees that only one CPU has write access to a single host virtual page 1980. When the guest operating system reschedules task 521 from CPU 501 to CPU 524, the unaltered host translation tables are able to provide that feature.

The host translation tables for all CPUs can be set up to map every possible page of host physical memory. The guest operating system restricts tasks to the allowed guest physical address space, which limits the available host physical address space. The host translation tables only need to be created once. Deterministic shared memory access can be guaranteed by modifying the host translation table R/W and Present bits without tracking any modifications being made to the guest translation tables.

In some implementations of a continuous replay fault tolerance computer system, micro journaling of PF events may occur. Additionally, asynchronous shadow updates may combined with micro-journal entries.

A journal entry usually includes a set of values for every processor, as shown in FIG. 13. A step in the journal file describes the state of each processor in the compute environment 115 at the time the journal entry is created. Generally, when a processor faults on a page access, the following steps are taken:

1. Processors are forced into lockstep management 240.
2. The page access privileges of the processors are adjusted to give the faulting processor the required access.
3. A journal entry is created describing the state of each processor before the processor entered lockstep management 240.
4. The processors are allowed to continue operation with modified page access privileges.

In many cases, the privileges of only a subset of the available processors are modified to satisfy the request. The disturbance in the operations of other processors generally represents lost performance. A modified control flow to allow the unaffected processors uninterrupted operation is as follows:

1. Determine processors that are affected by granting the requested page access.
2. Force affected processors into lockstep management 240.
3. Adjust the page access privileges of the affected processors to give the faulting processor the required access.
4. Create a micro journal entry showing only the affected processors.

Note that time injection generally is not allowed on a micro journal entry because the passage of time is visible to all processors. Also note that input consumption is only allowed to those processors that are currently in lockstep management 240.

5. The processors are allowed to continue operation with modified page access privileges.

The updates that are being made to the paging structures during micro journal entries are asynchronous to some of the processors in the compute environment 115. Several micro journal entries can be created one after another. The complexities of the interactions between micro journal entries should be tracked by lockstep management 240 in system 110. A complete journal entry is generally required to clear the knowledge base of interactions between the micro journal entries.

A simple example for using micro journal entries is a new task running on processor C that acquires pages of memory as the task is loaded. Processors A and B have no overlap with the task running on processor C. A page fault by processor C has no affect on the address spaces of processors A and B and, as such, processors A and B do not need to be disturbed to grant the request from processor C. If the tasks on processors A and B are threads from a common process, then a request by processor A affects the address space of processor B because the processors share a common address space. However, processor C is not affected. Therefore, micro journal entries for processor C avoid impacting processors A and B, and micro journal entries for processors A and B avoid impacting processor C.

Figure 20:
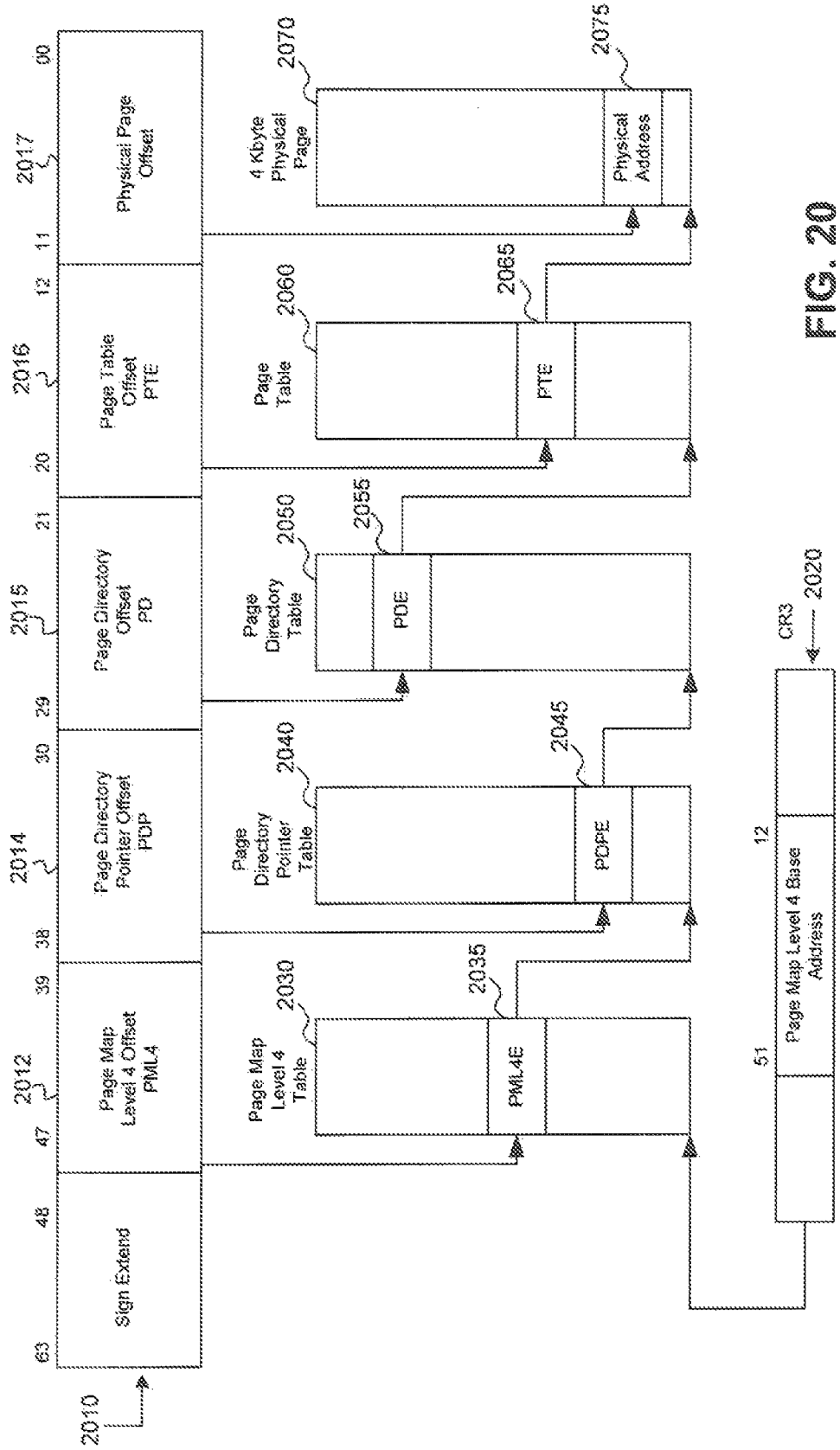
Figure 22:
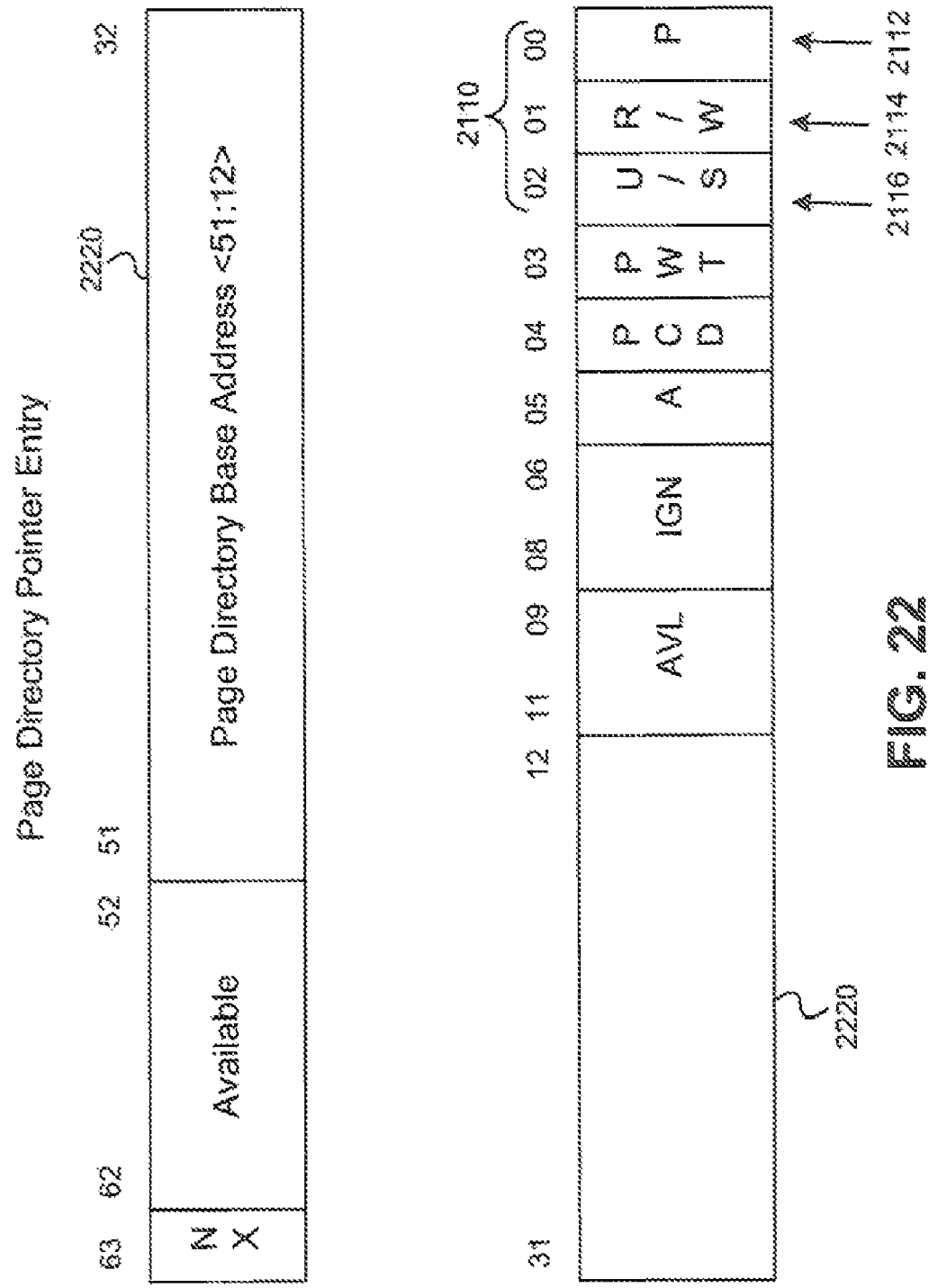

FIGS. 20-24 illustrate a virtual memory translation structure using 4 k pages for the 64-bit extension to the x86 processor from Intel® or AMD. FIG. 20 shows a virtual memory translation process.

Referring to FIG. 20, an example translation process 2000 shows the translation of virtual address 2010 to a physical address with the use of four tables 2030, 2040, 2050 and 2060. An instruction makes a reference to memory using a 48 bit virtual address 2010. Register CR3 2020 includes the base address of the Page Map Level 4 Table 2030. Bits <47:39> 2012 of the virtual address 2010 provide a 9-bit offset from the Page Map Level 4 Table base. The contents of this memory location is called the Page Map Level 4 Entry (PML4E) 2035, which provides the base address for the Page Directory Pointer Table 2040. Bits <38:30> 2014 of the virtual address 2010 provide a 9-bit offset from the Page Directory Pointer Table base. The contents of this memory location is called the Page Directory Pointer Entry (PDPE) 2045, which provides the base address for the Page Directory Table 2050. Bits <29:21> 2015 of the virtual address 2010 provide a 9-bit offset from the Page Directory Table base. The contents of this memory location is called the Page Directory Entry (PDE) 2055, which provides the base address for the Page Table 2060. Bits <20:12> 2016 of the virtual address 2010 provide a 9-bit offset from the Page Table base. The contents of this memory location is called the Page Table Entry (PTE) 2065, which provides the base address for the Physical Page of memory being referenced. Bits <11:00> 2017 of the virtual address 2010 provide the 12-bit offset from the Physical Page 2070 to the physical memory location being referenced 2075.

FIGS. 21-24 show formats of the Page Map Level 4 Entry 2100, Page Directory Pointer Entry 2200, Page Directory Entry 2300, and Page Table Entry 2400, respectively. The bits of particular interest in these tables are bits <2:0> 2110. Bit 0 is the Present (P) flag 2112, which generally indicates that the structure being pointed to by the base address (bits<51:12>) 2120, 2220, 2320 or 2420, respectively, is present in memory and not paged-out to disk. Bit 1 indicates Read/Write (R/W) privileges 2114 to the structure to which the entry points. Bit 2 indicates whether User or System (U/S) access 2116 is allowed to the structure to which the entry points.

Implementations of the techniques may include a method or process, a system or apparatus, or computer software on a computer-accessible medium. Other implementations are within the scope of the following claims.

What is claimed is:

1. A method of implementing a fault-tolerant computer system using symmetric multiprocessing computer systems, the method comprising controlling at least one of the symmetric multiprocessing computer systems by:
   creating virtual paging structures, a virtual paging structure being associated with a processor in the symmetric multiprocessing computer system and reflecting physical page access privileges to shared memory for the processor; and
   controlling access to shared memory based on physical page access privileges reflected in the virtual paging structures to coordinate deterministic shared memory access between processors in the symmetric multiprocessing computer system.

2. The method of claim 1 wherein controlling access to shared memory comprises:
   receiving a request from a processor to access a portion of memory;
   determining access to the portion of memory to be permitted by the processor by comparing the virtual paging structure for the processor to the virtual paging structures for other processors that access the portion of memory; and
   updating physical page access privileges in the virtual paging structure for the processor based on the access to be permitted by the processor.

3. The method of claim 1 wherein the processor comprises a task executing on a processor.

4. The method of claim 1 wherein the virtual paging structure comprises shadow page tables, wherein a shadow page table comprises a copy of a page table created by the operating system of the symmetric multiprocessing computer system and is associated with a processor of the symmetric multiprocessing computer system.

5. The method of claim 1 wherein the virtual paging structure comprises nested page tables that collectively provide two or more levels of virtual to physical translation.

6. The method of claim 1 wherein creating virtual paging structures comprises creating page tables prior to execution of any task by a processor in the symmetric multiprocessing computer system.

7. The method of claim 1 wherein creating virtual paging structures comprises creating at least page directories prior to execution of any task by a processor in the symmetric multiprocessing computer system.

8. The method of claim 1 wherein the fault-tolerant computer system is a duplication fault tolerant computer system comprising two symmetric multiprocessing computer systems operating simultaneously in instruction lock-step and each controlling access to shared memory based on physical page access privileges reflected in virtual paging structures to coordinate deterministic shared memory access between processors in the symmetric multiprocessing computer system.

9. The method of claim 1 wherein:
   the symmetric multiprocessing computer system comprises a first symmetric multiprocessing computer system, and
   the fault-tolerant computer system is a continuous replay fault-tolerant computer system comprising the first symmetric multiprocessing computer system and a second symmetric multiprocessing computer system, the method further comprising:
   having the first symmetric multiprocessing computer system process an instruction stream and create a journal reflecting a sequence of events at the first symmetric multiprocessing computer system, and
   when a failure of the first symmetric multiprocessing computer system is detected, processing the journal using the second symmetric multiprocessing computer system, such that the first and second symmetric multiprocessing computer systems operate in instruction lock-step,
   having the second symmetric multiprocessing computer system create virtual paging structures, with a virtual paging structure being associated with a processor in the second symmetric multiprocessing computer system and reflecting physical page access privileges to shared memory for the processor, and
   having the second symmetric multiprocessing computer system control access to shared memory based on physical page access privileges reflected in the virtual paging structures to coordinate deterministic shared memory access between processors in the second symmetric multiprocessing computer system.

10. Computer software, stored on a computer-readable medium, comprising instructions that, when executed, control at least one symmetric multiprocessing computer system of a fault-tolerant computer system by:

creating virtual paging structures, a virtual paging structure being associated with a processor in the symmetric multiprocessing computer system and reflecting physical page access privileges to shared memory for the processor; and controlling access to shared memory based on physical page access privileges reflected in the virtual paging structures to coordinate deterministic shared memory access between processors in the symmetric multiprocessing computer system.

11. The computer software of claim 10 wherein controlling access to shared memory comprises:
receiving a request from a processor to access a portion of memory;
determining access to the portion of memory to be permitted by the processor by comparing the virtual paging structure for the processor to the virtual paging structures for other processors that access the portion of memory; and
updating physical page access privileges in the virtual paging structure for the processor based on the access to be permitted by the processor.

12. The computer software of claim 10 wherein the processor comprises a task executing on a processor.

13. The computer software of claim 10 wherein the virtual paging structure comprises shadow page tables, wherein a shadow page table comprises a copy of a page table created by the operating system of the symmetric multiprocessing computer system and is associated with a processor of the symmetric multiprocessing computer system.

14. The computer software of claim 10 wherein the virtual paging structure comprises nested page tables that collectively provide two or more levels of virtual to physical translation.

15. The computer software of claim 10 wherein creating virtual paging structures comprises creating page tables prior to execution of any task by a processor in the symmetric multiprocessing computer system.

16. The computer software of claim 10 wherein creating virtual paging structures comprises creating at least page directories prior to execution of any task by a processor in the symmetric multiprocessing computer system.

17. The computer software of claim 10 wherein the fault-tolerant computer system is a duplication fault tolerant computer system comprising two symmetric multiprocessing computer systems operating simultaneously in instruction lock-step and each controlling access to shared memory based on physical page access privileges reflected in virtual paging structures to coordinate deterministic shared memory access between processors in the symmetric multiprocessing computer system.

18. The computer software of claim 10 wherein:
the symmetric multiprocessing computer system comprises a first symmetric multiprocessing computer system, and
the fault-tolerant computer system is a continuous replay fault-tolerant computer system comprising the first symmetric multiprocessing computer system and a second symmetric multiprocessing computer system, the method further comprising:
having the first symmetric multiprocessing computer system process an instruction stream and create a journal reflecting a sequence of events at the first symmetric multiprocessing computer system, and
when a failure of the first symmetric multiprocessing computer system is detected, processing the journal using the second symmetric multiprocessing computer system, such that the first and second symmetric multiprocessing computer systems operate in instruction lock-step,
having the second symmetric multiprocessing computer system create virtual paging structures, with a virtual paging structure being associated with a processor in the second symmetric multiprocessing computer system and reflecting physical page access privileges to shared memory for the processor, and
having the second symmetric multiprocessing computer system control access to shared memory based on physical page access privileges reflected in the virtual paging structures to coordinate deterministic shared memory access between processors in the second symmetric multiprocessing computer system.

19. A duplication fault-tolerant computer system comprising two symmetric multiprocessing computer systems operating simultaneously in instruction lock-step and each controlling access to shared memory based on physical page access privileges reflected in virtual paging structures to coordinate deterministic shared memory access between processors in the symmetric multiprocessing computer system,
wherein a virtual paging structure is associated with a processor in one of the symmetric multiprocessing computer systems and reflects physical page access privileges to shared memory for the processor.

20. The fault-tolerant computer system of claim 19 wherein controlling access to shared memory comprises:
receiving a request from a processor to access a portion of memory;
determining access to the portion of memory to be permitted by the processor by comparing the virtual paging structure for the processor to the virtual paging structures for other processors that access the portion of memory; and
updating physical page access privileges in the virtual paging structure for the processor based on the access to be permitted by the processor.

21. The fault-tolerant computer system of claim 19 wherein the processor comprises a task executing on a processor.

22. The fault-tolerant computer system of claim 19 wherein the virtual paging structure comprises shadow page tables, wherein a shadow page table comprises a copy of a page table created by the operating system of the symmetric multiprocessing computer system and is associated with a processor of the symmetric multiprocessing computer system.

23. The fault-tolerant computer system of claim 19 wherein the virtual paging structure comprises nested page tables that collectively provide two or more levels of virtual to physical translation.

24. The fault-tolerant computer system of claim 19 wherein creating virtual paging structures comprises creating page tables prior to execution of any task by a processor in the symmetric multiprocessing computer system.

25. The fault-tolerant computer system of claim 19 wherein creating virtual paging structures comprises creating at least page directories prior to execution of any task by a processor in the symmetric multiprocessing computer system.

26. A continuous replay fault-tolerant computer system comprising:
a first symmetric multiprocessing computer system and a second symmetric multiprocessing computer system operating in instruction lockstep, each controlling access to shared memory based on physical page access privileges reflected in virtual paging structures to coordinate deterministic shared memory access between processors in the symmetric multiprocessing computer system;

the first symmetric multiprocessing computer system processing an instruction stream and creating a journal reflecting sequence of events at the first symmetric multiprocessing computer system; and when a failure of the first symmetric multiprocessing computer system is detected, processing the journal using the second symmetric multiprocessing computer system, the first and second symmetric multiprocessing computer systems operating in instruction lock-step, wherein a virtual paging structure is associated with a processor in each of the symmetric multiprocessing computer systems and reflects physical page access privileges to shared memory for the processor.

27. The fault-tolerant computer system of claim 26 wherein controlling access to shared memory comprises:

receiving a request from a processor to access a portion of memory;

determining access to the portion of memory to be permitted by the processor by comparing the virtual paging structure for the processor to the virtual paging structures for other processors that access the portion of memory; and updating physical page access privileges in the virtual paging structure for the processor based on the access to be permitted by the processor.

28. The fault-tolerant computer system of claim 26 wherein the processor comprises a task executing on a processor.

29. The fault-tolerant computer system of claim 26 wherein the virtual paging structure comprises shadow page tables, wherein a shadow page table comprises a copy of a page table created by the operating system of the symmetric multiprocessing computer system and is associated with a processor of the symmetric multiprocessing computer system.

30. The fault-tolerant computer system of claim 26 wherein the virtual paging structure comprises nested page tables that collectively provide two or more levels of virtual to physical translation.

31. The fault-tolerant computer system of claim 26 wherein creating virtual paging structures comprises creating page tables prior to execution of any task by a processor in the symmetric multiprocessing computer system.

32. The fault-tolerant computer system of claim 26 wherein creating virtual paging structures comprises creating at least page directories prior to execution of any task by a processor in the symmetric multiprocessing computer system.

* * * * *